(12) United States Patent
Shaver et al.

(10) Patent No.: US 8,552,980 B2
(45) Date of Patent: Oct. 8, 2013

(54) COMPUTER INPUT DEVICES AND ASSOCIATED COMPUTING DEVICES, SOFTWARE, AND METHODS

(76) Inventors: Gregory A. Shaver, Springfield, OR (US); David S. D'Ascenzo, Portland, OR (US); Ian D. Gates, Portland, OR (US)

( * ) Notice: Subject to any disclaimer, the term of this patent is extended or adjusted under 35 U.S.C. 154(b) by 489 days.

(21) Appl. No.: 12/769,888

(22) Filed: Apr. 29, 2010

(65) Prior Publication Data
US 2010/0207880 A1 Aug. 19, 2010

Related U.S. Application Data

(60) Provisional application No. 61/174,089, filed on Apr. 30, 2009.

(51) Int. Cl.
*G06F 3/033* (2013.01)
*G09G 5/08* (2006.01)

(52) U.S. Cl.
USPC .......................................................... 345/158

(58) Field of Classification Search
USPC .......................................................... 345/158
See application file for complete search history.

(56) References Cited

U.S. PATENT DOCUMENTS

| | | |
|---|---|---|
| 4,933,670 A | 6/1990 | Wislocki |
| 5,237,311 A | 8/1993 | Mailey et al. |
| 5,252,970 A | 10/1993 | Baronowsky |
| 5,298,919 A | 3/1994 | Chang |
| 5,313,230 A | 5/1994 | Venolia et al. |
| 5,565,891 A | 10/1996 | Armstrong |
| 5,670,987 A | 9/1997 | Doi et al. |
| 5,784,052 A | 7/1998 | Keyson |
| 6,075,533 A | 6/2000 | Chang |
| 7,084,859 B1 | 8/2006 | Pryor |
| 2004/0008189 A1 | 1/2004 | Clapper et al. |
| 2005/0162398 A1 | 7/2005 | Eliasson et al. |
| 2006/0022956 A1 | 2/2006 | Lengeling et al. |
| 2007/0176908 A1 * | 8/2007 | Lipman et al. ................ 345/179 |
| 2007/0252832 A1 | 11/2007 | Ratai |
| 2008/0122788 A1 * | 5/2008 | Sirtori ........................... 345/158 |
| 2008/0238884 A1 * | 10/2008 | Harish ......................... 345/174 |
| 2009/0058829 A1 * | 3/2009 | Kim et al. .................... 345/173 |

OTHER PUBLICATIONS

"Mouse (computing)." *Wikipedia*. May 30, 2009.
"SpaceNavigator 3D mouse." *3Dconnexion*. Jun. 3, 2009.
"Sandio 3D O2," *Sandia Technology Products*. Jun. 3, 2009.
"3D Touchpad from Ukraine." *Englishrussia*. Jun. 3, 2009.

* cited by examiner

*Primary Examiner* — Kevin M Nguyen
(74) *Attorney, Agent, or Firm* — Dascenzo Intellectual Property Law, P.C.

(57) ABSTRACT

Computer input devices include a detector adapted to detect relative movement of an input member in x-, y-, and z-dimensions relative to a base point in a base plane, and a controller adapted to send a signal to an associated computing device based at least in part on the relative movement of the input member. Associated computing devices, software, and methods are also disclosed.

37 Claims, 13 Drawing Sheets

COMPUTER INPUT DEVICES AND ASSOCIATED COMPUTING DEVICES, SOFTWARE, AND METHODS

RELATED APPLICATION

This application claims priority to U.S. Provisional Patent Application Ser. No. 61/174,089, which is entitled "Computer Input Devices and Associated Computing Devices, Software, and Methods," was filed on Apr. 30, 2009, and the complete disclosure of which is hereby incorporated by reference.

FIELD OF THE DISCLOSURE

The present disclosure is directed generally to computer input devices, computing devices that incorporate computer input devices, software, and associated methods. More particularly, the present disclosure is directed to computer input devices that enable user input in x-, y-, and z-dimensions, including user input in a plurality of strata or planes spaced in the z-dimension, and to associated computing devices, software, and methods.

BACKGROUND

As long as there have been computers, there have been devices for inputting data to computers. From punch card readers to mice to touch screens, a number of computer input devices have been employed and are in use today. With the proliferation of handheld computing devices, such as tablet PCs, personal digital assistants (PDAs), and smart phones, touch screens have become an increasingly popular form of computer input devices. Examples of computer input devices and associated computing devices are disclosed in U.S. Pat. Nos. 6,894,683, 6,952,203, 7,199,787, 7,295,191, 7,348,968, 7,479,949, 7,564,446, 7,577,924, and 7,614,008, and U.S. Patent Application Publication Nos. 2004/0046742, 2006/0022956, and 2008/0084396, the complete disclosures of which are hereby incorporated by reference.

SUMMARY OF THE DISCLOSURE

Computer input devices according to the present disclosure include a detector adapted to detect relative movement of an input member in x-, y-, and z-dimensions relative to a base point in a base plane, and a controller adapted to send a signal to an associated computing device based at least in part on the relative movement of the input member. Associated computing devices, software, and methods are also disclosed and within the scope of the present disclosure.

DETAILED DESCRIPTION AND BEST MODE OF THE DISCLOSURE

Figure 1:
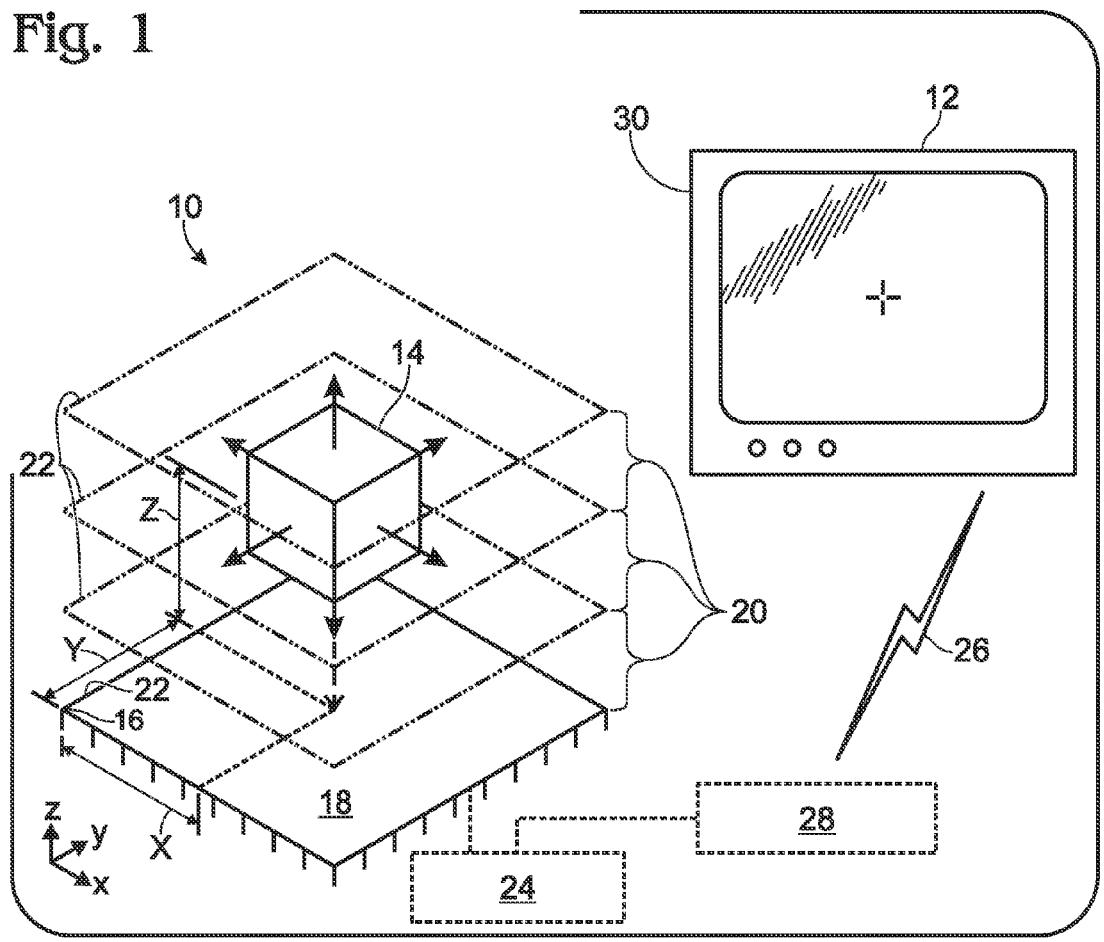
FIG. 1 is a diagram schematically illustrating computer input devices according to the present disclosure, together with an associated computing device.

Computer input devices according to the present disclosure are schematically illustrated in FIG. 1 and are generally indicated at 10. In FIG. 1, computer input device 10 is schematically illustrated together with an associated computing device 12. As schematically illustrated, computer input devices according to the present disclosure may include, be embodied by, or at least utilize, an input member 14 that is capable of being (and designed and/or configured to be) moved, translated, or otherwise manipulated by a user in three dimensions relative to a base point 16 on a base plane 18, and further capable of providing inputs, such as input signals, to an associated computing device while being moved and corresponding to the input member's movement. For example, the input member may be generally manipulated in the x- and y-dimensions within a plurality of strata 20 spaced from the base plane in the z-dimension. Additionally or alternatively, the input member may be manipulated along, within, or adjacent to a plurality of planes 22 spaced from the base plane. Additionally or alternatively, the input member may be manipulated solely in the z-dimension relative to the base plane. Additionally or alternatively, a plurality of input members may be included or utilized by a computer input device according to the present disclosure. Illustrative, non-exclusive examples of input members according to the present disclosure include (but are not limited to) a human hand, a human finger, a stylus, and a mouse. Other input members are also within the scope of the present disclosure.

In FIG. 1, four planes 22, including base plane 18, and three respective strata 20 are illustrated, but it is within the scope of the present disclosure that any number of planes and/or strata be used, including an infinite number of planes and/or strata and including a greater and/or a lesser number of planes and/or strata than are shown in the illustrative, non-exclusive example depicted in FIG. 1.

As used herein, x- and y-dimensions are parallel to base plane 18 and the z-dimension is perpendicular to base plane 18. That is, the x-, y-, and z-dimensions define a three-dimensional orthogonal space with the x- and y-dimensions being parallel to the base plane and the z-dimension being perpendicular to the base plane, as schematically indicated in FIG. 1. Relative movement of input member 14 therefore may be described in terms of relative movement in three-dimensions (i.e., in the x-, y-, and z-dimensions) relative to a base point in a base plane, in terms of relative movement in x- and y-dimensions within the base plane and/or within a stratum or plane spaced from the base plane, in terms of relative movement between one or more strata or planes spaced from the base plane in the z-dimension, in terms of relative movement in the z-dimension relative to the base plane, etc. Other descriptions also may be used.

In FIG. 1, input member 14 is schematically illustrated in an illustrative, non-exclusive position having (X, Y, Z) coordinates relative to base point 16. The base point is schematically illustrated as corresponding to a corner of base plane 18; however, it is within the scope of the present disclosure that a base point may be positioned anywhere on base plane 18. As discussed herein, it is also within the scope of the present disclosure that the base plane is not necessarily a threshold plane, in so far as planes 22 and/or strata 20 may be spaced on one or both sides of the base plane.

Computer input devices 10 according to the present disclosure are adapted to detect, or sense, user-imparted movement of input member 14 in the x-, y-, and z-dimensions relative to base point 16 in base plane 18. Accordingly, computer input devices according to the present disclosure may include one or more detectors 24, as schematically illustrated in FIG. 1. That is, computer input device 10 may include a plurality or multiplicity of detectors, including (but not limited to) 2, 3, 4, or 5 or more detectors. As also schematically illustrated in FIG. 1, the one or more detectors may (but are not required to) be coupled to, embodied by, or otherwise linked to the base plane (e.g., when the base plane corresponds to a touch screen, as discussed herein). Other configurations are also within the scope of the present disclosure.

Computer input devices 10 according to the present disclosure are further adapted to send a signal or signals 26 (e.g., to associated computing device 12) in response to the user-imparted movement of input member 14 and the detection thereof by the optional one or more detectors 24. Accordingly, computer input devices 10 according to the present disclosure may include one or more controllers 28 that are in communication with, and/or otherwise linked to, the one or more detectors, as schematically illustrated in FIG. 1. As further schematically illustrated in FIG. 1, the one or more controllers 28 are configured to transmit signal(s) 26, such as to an associated computing device 12. Accordingly, a controller 28 may additionally or alternatively be referred to as a transmitter, or a signal transmitter, 28, and may be (or form a portion of) a processor, integrated chip, printed circuit board, or other suitable computer hardware or electronic device. Signal(s) 26 may be transmitted to an associated computing device, or portion thereof, via wires, a wireless connection, or via any other suitable mechanism, as schematically illustrated in FIG. 1.

An associated display device 30 (e.g., of an associated computing device 12, as schematically illustrated in FIG. 1) may display manipulation of indicia based at least in part on the detecting user-imparted relative movement of input member 14, such as in the x-, y-, and/or z-dimensions. Additionally or alternatively, an associated display device may display manipulation of indicia based at least in part on the signal or signals 26 sent by the computer input device. In other words, in response to the manipulation of the input member, manipulation of indicia on a display device may be implemented, commanded, or otherwise selected.

As used herein, "associated" in the context of an associated computing device, associated display device, etc. refers to the device being operatively configured to be used with, such as to receive inputs from and/or to send inputs to, the device with which it is associated. For example, a computer input device may be operatively configured for use with an associated computing device, which may be configured to display outputs on an associated display device, etc. Additionally or alternatively, a computer input device according to the present disclosure and/or a display device according to the present disclosure may be described as being integral to, or as a component of, an associated computing device 12 according to the present disclosure.

Illustrative, non-exclusive examples of associated computing devices include (but are not limited to) personal computers, laptop computers, tablet PCs, and handheld computing devices such as personal digital assistants (PDAs), pocket PCs, cell phones, smart phones, digital cameras, electronic measuring devices, calculating devices, and the like. Other computing devices with a display device, a processor (or controller), and which are adapted to receive inputs from a computer input device are also within the scope of the present disclosure.

Illustrative, non-exclusive examples of display devices 30 include (but are not limited to) one or more monitors, projectors, display screens of handheld computing devices, touch (touch-sensitive) display screens, and the like. Other display devices are also within the scope of the present disclosure.

Illustrative, non-exclusive examples of manipulation of indicia include (but are not limited to) movement of a cursor, drawing within a drawing software application, and other manipulation of indicia on a display screen, such as commonly implemented through the use of keyboards, mice, touch screens, tablets, trackballs, and the like, or implemented by other commands associated with, or received by, a computing device.

Figure 2:
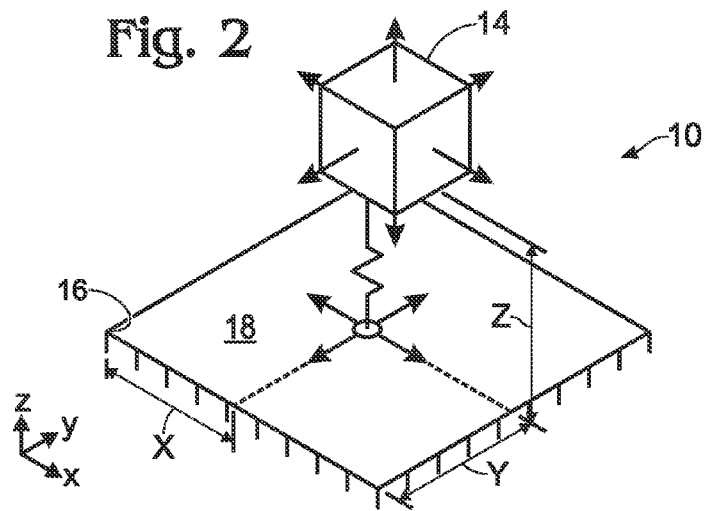
FIG. 2 is a diagram schematically illustrating illustrative, non-exclusive examples of computer input devices according to the present disclosure.

FIG. 2 schematically illustrates illustrative, non-exclusive examples of computer input devices 10 according to the present disclosure. As illustrated, the computer input devices of FIG. 2 may include an input member 14 that may be (and which are configured and/or designed to be) manipulated by a user in three dimensions (i.e., in the x-, y-, and z-dimensions) relative to base point 16 on base plane 18, for example, to provide user input, or commands, to an associated computing device, such as to manipulate indicia on a display screen and/or otherwise command the associated computing device to perform a computing operation, etc.

The Figures, including previously discussed FIG. 1, presently discussed FIG. 2, and subsequent Figures of the present disclosure are schematically illustrated and are not intended to be drawn to scale, as they have been presented to emphasize and illustrate various aspects of the present disclosure. In the Figures, the same reference numerals designate like and corresponding, but not necessarily identical, elements throughout the various drawing Figures. Accordingly, when like-numbered elements are shown in two or more Figures, they may not be discussed in each such Figure, and it is within the scope of the present disclosure that the preceding discussion shall apply unless otherwise indicated. Similarly, where like-numbered elements, including illustrative values, configurations, variants, optional structure and/or features, subelements, and the like, are described in two or more portions of the present disclosure and/or in connection with two or more Figures, it is within the scope of the present disclosure that these illustrative values, compositions, variants thereof, and the like may be applied even if not repeated in the discussion at each occurrence.

Figure 3:
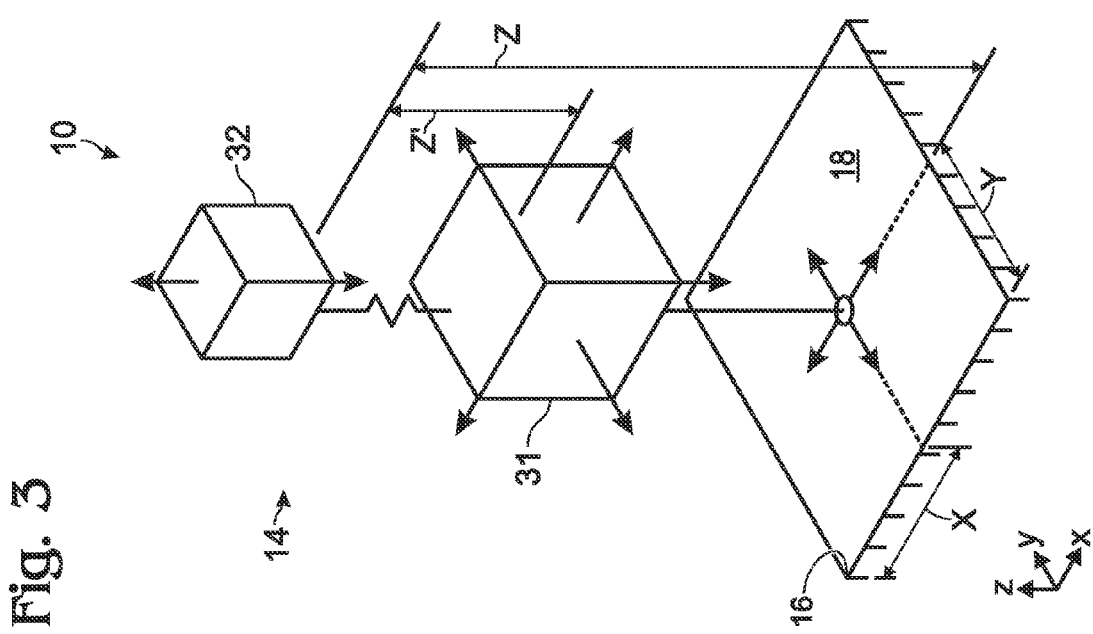
FIG. 3 is a diagram schematically illustrating illustrative, non-exclusive examples of computer input devices according to the present disclosure.

FIG. 3 schematically illustrates further illustrative, non-exclusive examples of computer input devices 10 according to the present disclosure. As illustrated, input members 14 according to the present disclosure may include at least two portions. A first portion 31 may be manipulated, directly or indirectly, by a user in the x- and y-dimensions relative to base point 16 on base plane 18 at a fixed distance in the z-dimension relative to the base plane. A second portion 32 may be manipulated, directly or indirectly, by a user in the z-dimension relative to first portion 31 of the input member and thus in the z-dimension relative to the base plane. In such examples, the computer input device or input member may (but is not required to) include structure configured to enable discrete user selection of a stratum or plane from a plurality of strata or planes relative to the base plane. For example, the computer input device or input member may, through relative movement of at least a portion thereof in the z-dimension, enable user selection of a plurality of strata or planes, such as may be bounded by minimum and maximum positions.

In FIG. 3, the second portion of the input member is schematically illustrated a Z distance away from the base plane and Z' distance away from the first portion of the input member. Accordingly, the distance Z' varies based on the manipulation of the input member by a user.

Figure 4:
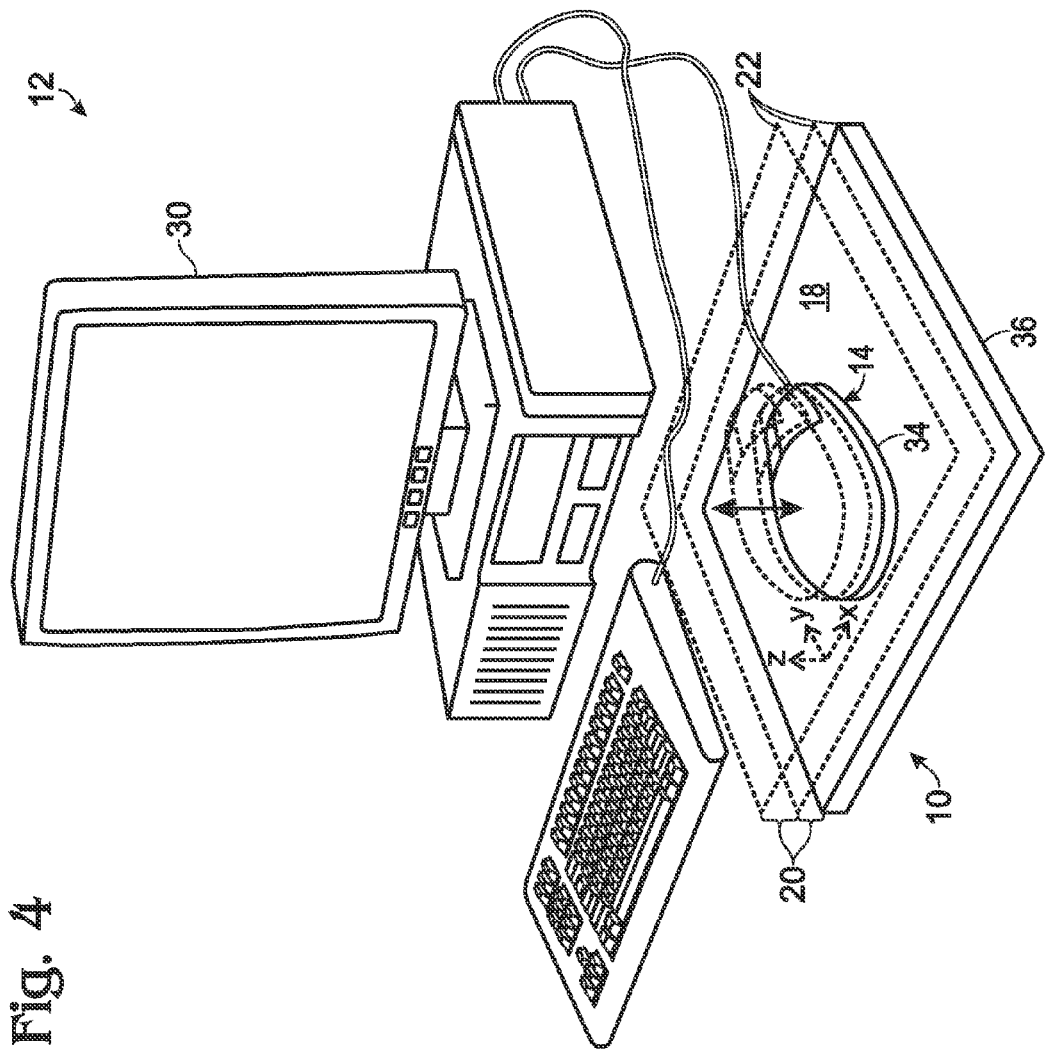
FIG. 4 is an illustration of an illustrative, non-exclusive example of a computer input device according to the present disclosure in the form of a mouse, shown together with an associated computing device, and schematically illustrating usage of the illustrated mouse.

FIG. 4 illustrates an illustrative, non-exclusive example of a computer input device 10 according to the present disclosure in the form of a mouse 34, together with an associated computing device 12 in the form of a personal computer. As schematically illustrated in FIG. 4, the mouse may be manipulated in x-, y-, and z-dimensions relative to a base plane, such as relative to a mouse pad 36 or other surface upon which the mouse may be translated, such as between a plurality of strata 20 and/or planes 22.

Figure 5:
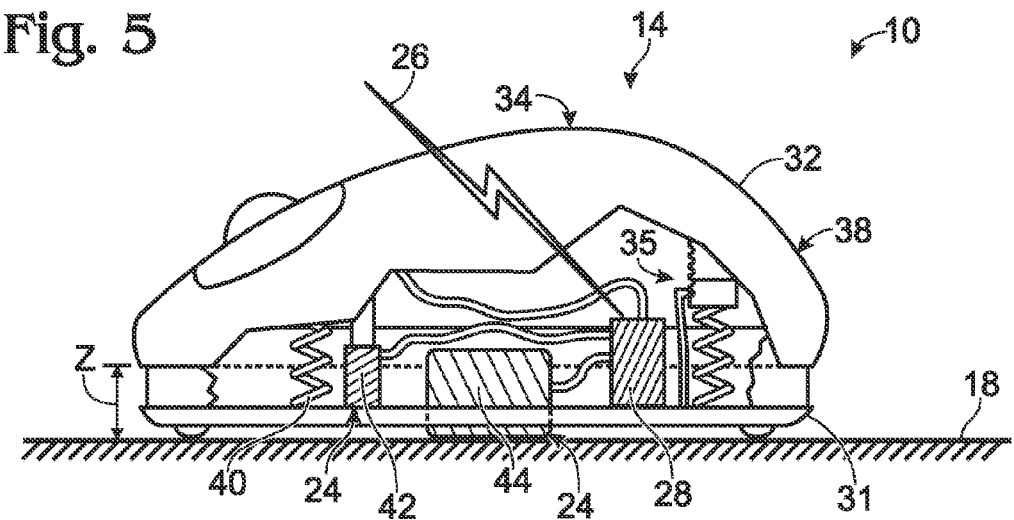
FIG. 5 is a somewhat schematic illustration of an illustrative, non-exclusive example of a computer input device according to the present disclosure in the form of a mouse shown with the mouse in a fully expanded configuration.
Figure 6:
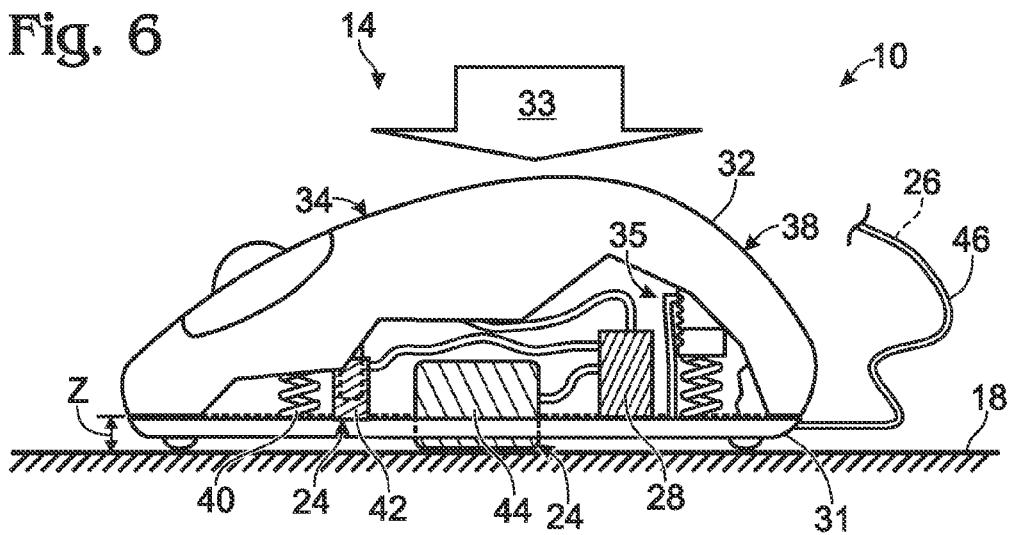
FIG. 6 is a somewhat schematic illustration of another illustrative, non-exclusive example of a computer input device according to the present disclosure in the form of a mouse shown with the mouse in a fully compressed configuration.

FIGS. 5-6 illustrate computer input devices 10 according to the present disclosure in the form of mice 34. The mice of FIGS. 5-6 may be described as examples of computer input devices schematically illustrated in FIG. 3. That is, the mice of FIGS. 5-6 each include a housing 38 having two portions. A first, or lower, portion 31 of the housing is configured to be manipulated in the x- and y-dimension relative to the base plane, but not in the z-dimension. A second, or upper, portion 32 of the housing is configured to be manipulated in the z-dimension relative to the lower portion and thus relative to the base plane in the z-dimension. The mouse of FIG. 5 is illustrated as being in a fully expanded configuration, and the mouse of FIG. 6 is illustrated as being in a fully compressed configuration, for example, as a result of a user imparting a downward force against second portion 32, as schematically indicated at 33. In other words, in FIG. 5, the upper portion of the illustrated mouse is at a maximum distance Z relative to base plane 18, and in FIG. 6, the upper portion of the illustrated mouse is at a minimum distance Z relative to the base plane 18.

The mice of FIGS. 5-6 are examples of computer input devices 10 and input members 14 that may (but are not required to) include structure, such as detents, 35 to enable user selection of a discrete stratum or plane from a plurality of strata or planes relative to the base plane. These strata and/or planes may include one or more strata and/or planes between the fully expanded configuration and a fully compressed configuration. Such structure, or detents, 35 are suitable for embodiments other than just mice, and may be incorporated into any suitable example of computer input devices 10 according to the present disclosure.

The illustrative, non-exclusive examples of mice 34 of FIGS. 5-6, are schematically illustrated as including a biasing device, or spring, 40 that biases the upper housing away from the base plane, a mouse compression sensor 42 that detects the position of the upper portion relative to the base plane, a lateral tracking sensor 44 that detects the x- and y-positions of the input member relative to a base point on the base plane, and a controller/processor 28. Mouse compression sensor 42 and lateral tracking sensor 44 are illustrative, non-exclusive examples of detectors 24 according to the present disclosure. The example of FIG. 5 is schematically illustrated as being adapted to send wireless signals 26 to an associated computing device, whereas the example of FIG. 6 includes a wire 46 for transmitting signals 26 to an associated computing device.

Figure 7:
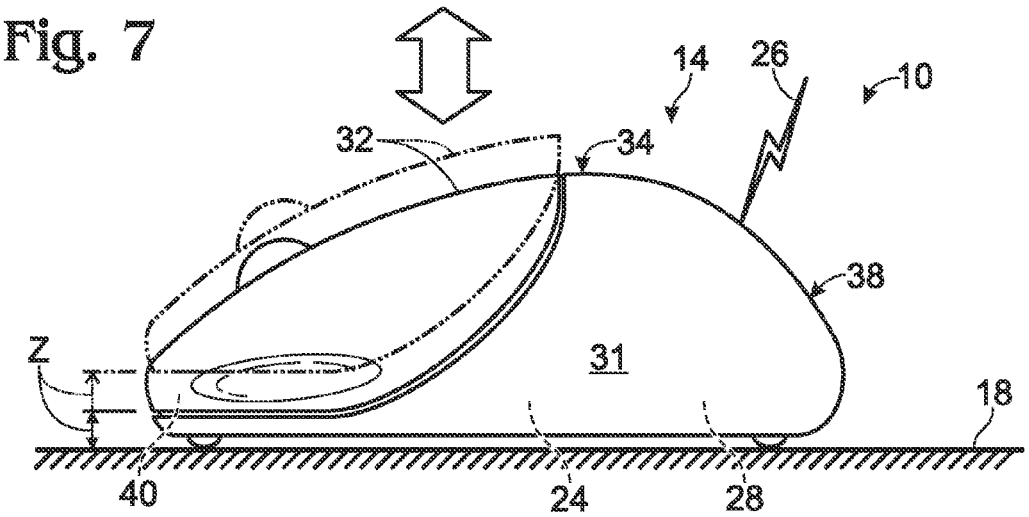
FIG. 7 is a somewhat schematic illustration of an illustrative, non-exclusive example of a computer input device according to the present disclosure in the form of a mouse.

FIG. 7 illustrates another example of a computer input device 10 according to the present disclosure in the form of a mouse 34. Like the mice of FIGS. 5-6, the mouse of FIG. 7 is an example of the computer input devices 10 schematically illustrated in FIG. 3. The mouse of FIG. 7 includes a first portion 31 that may be described as a base portion, and a second portion 32 that may be described as a forward upper portion that is configured to be manipulated in the z-dimension relative to the base portion. Accordingly, the example of FIG. 7, like the examples of FIGS. 5-6, includes at least two housing portions, with one of the housing portions manipulable in the z-dimension relative to the other of the at least two housing portions. Although illustrated as being a forward upper portion, second portion 32 may have any suitable position relative to the base portion, including (but not limited to) being in a generally rearward position and/or in a generally middle position. It is also within the scope of the present disclosure that portion 31 may have any suitable size relative to base portion 32. For example, while illustrated as spanning approximately ½ the length of the mouse 34, portion 31 may span less than ½, greater than ½, approximately ⅕, ¼, ⅓, ½, ⅔, ¾, or ⅘, ⅕-⅘, ¼-¾, or ⅓-⅔ the length of the mouse. Other sizes and ranges are also within the scope of the present disclosure including sizes within, less than, and greater than the enumerated ranges.

Figure 8:
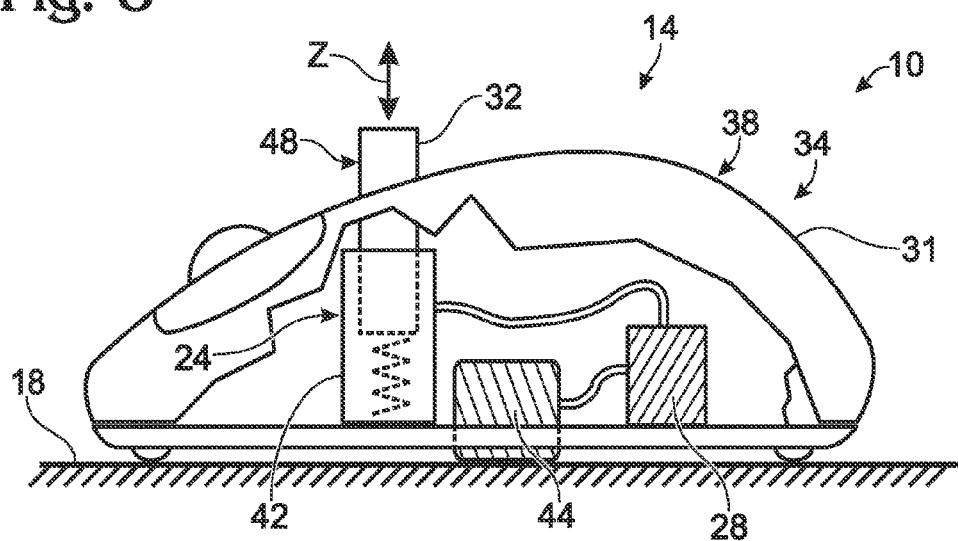
FIG. 8 is a somewhat schematic illustration of another illustrative, non-exclusive example of a computer input device according to the present disclosure in the form of a mouse.

FIG. 8 illustrates yet another example of a computer input device 10 according to the present disclosure in the form of a mouse 34. Like the mice of FIGS. 5-7, the mouse of FIG. 8 is an example of the computer input devices 10 schematically illustrated in FIG. 3. However, rather than having a housing having two housing portions, the mouse of FIG. 8 includes a second portion 32 in the form of a button 48 that may be manipulated in the z-dimension relative to the housing 38 of the mouse, which defines the first portion 31 of the input member, and thus relative to base plane 18.

Figure 9:
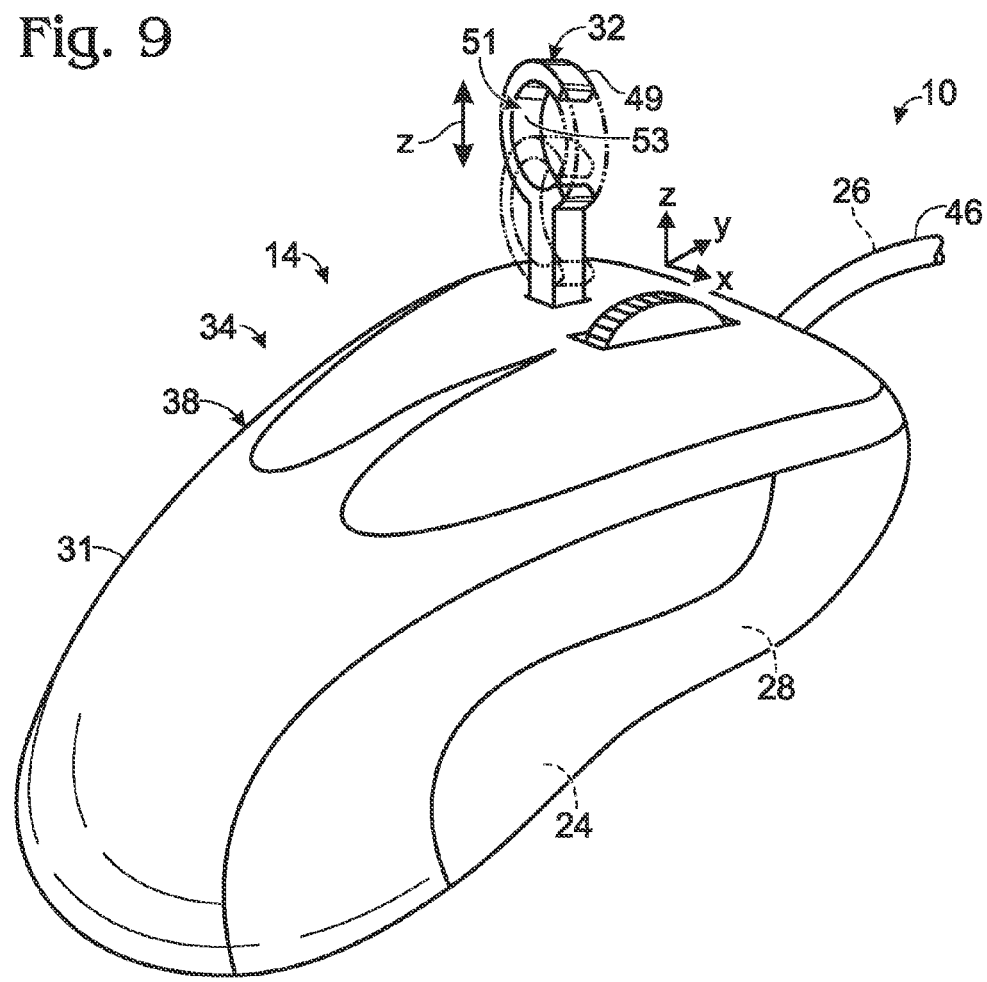
FIG. 9 is a somewhat schematic illustration of another illustrative, non-exclusive example of a computer input device according to the present disclosure in the form of a mouse.

FIG. 9 illustrates yet another example of a computer input device according to the present disclosure in the form of a mouse 34. Like the mice of FIGS. 5-8, the mouse of FIG. 9 is an example of the computer input devices 10 schematically illustrated in FIG. 3. However, the mouse of FIG. 9 includes a second portion 32 in the form of a finger-receiving portion 49 that may be manipulated in the z-dimension relative to the housing 38 of the mouse, which defines first portion 31 of the input member. Finger-receiving portion 49 is configured to receive and be engaged by a user's finger so that the user may manipulate finger-receiving portion 49 relative to housing 38 in the z-dimension. In the illustrative, non-exclusive example illustrated, the finger-receiving portion 49 includes a hook, or partial ring, to enable a user to easily position his/her finger within the finger-receiving portion and to raise and lower the finger-receiving portion, simply by raising and lowering his/her finger. Additionally or alternatively, as optionally illustrated in dash-dot-dot lines in FIG. 9, the finger-receiving region may include a fully-enclosed ring. Finger-receiving portion 49 may be described as defining a finger-receiving region 51, through which a user's finger may extend. Additionally or alternatively, finger-receiving portion 49 may define at least one finger-engagement surface 53, which enables a user to manipulate the finger-receiving portion in the z-dimension. In the illustrated example, the finger-receiving portion is positioned for a user's index finger; however, any suitable configuration may be used, including configurations in which the finger-receiving portion is positioned for manipulation by a user's thumb, middle finger, ring finger, and/or pinkie finger. The finger-receiving portion 49 is an example of a second portion 32 that may not (although may) be biased in the z-dimension, such as by a spring (e.g., spring 40 of FIGS. 5-6). Rather, a mouse may include structure that frictionally, or otherwise, enables the finger-receiving portion to remain in a selected position in the z-dimension upon positioning by a user, even when the user removes his/her finger from the finger-receiving portion. Other configurations are also within the scope of the present disclosure.

The relative movement of the second portion 32 with respect to the first portion 31 of the respective housings of the mice of FIGS. 5-9 is distinguished from the relative movement of a button on a typical mouse, in that a typical mouse's button is associated with only two states (depressed and not depressed). That is, a typical mouse includes a switch having an on configuration and an off configuration, respectively, and that are controlled by the button. In contrast and as discussed herein, the relative movement of the second portion 32 relative to first portion 31 of an input member 14 in the z-dimension may be sensed, or detected, throughout a plurality of strata or planes, and is not limited to only including two positions, such as defining an off configuration and an on configuration.

The illustrative, non-exclusive examples of mice 34 illustrated in FIGS. 5-9 are provided as examples only and may include additional components, such as typical controls of typical mice, including (but not limited to) buttons (e.g., right, middle, left, side, etc.), scroll wheels, etc.

Figure 10:
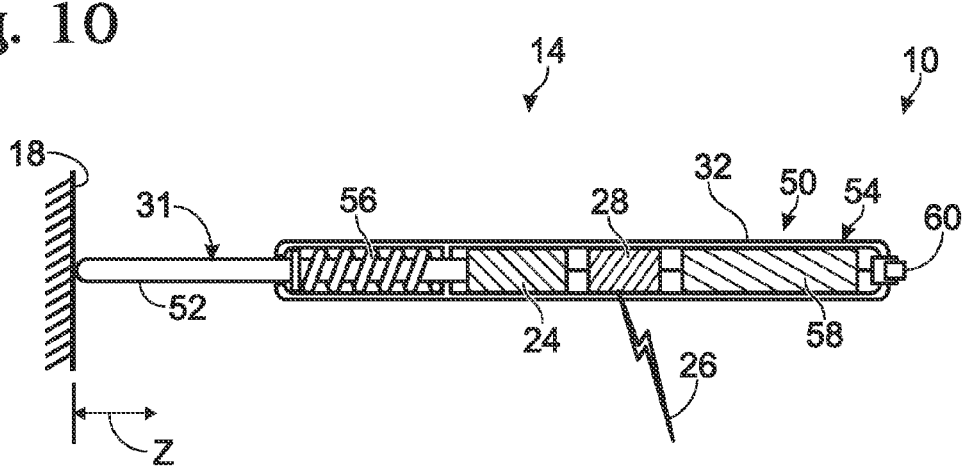
FIG. 10 is a somewhat schematic illustration of another illustrative, non-exclusive example of a computer input device according to the present disclosure in the form of a stylus shown in a fully extended configuration and together with an associated touch screen.
Figure 11:
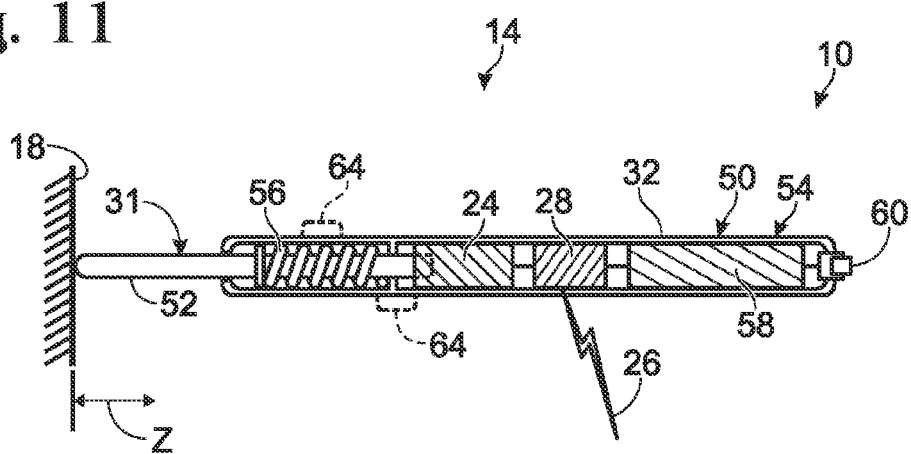
FIG. 11 is a somewhat schematic illustration of another illustrative, non-exclusive example of a computer input device according to the present disclosure in the form of a stylus shown with the stylus in an intermediate state of compression and together with an associated touch screen.
Figure 12:
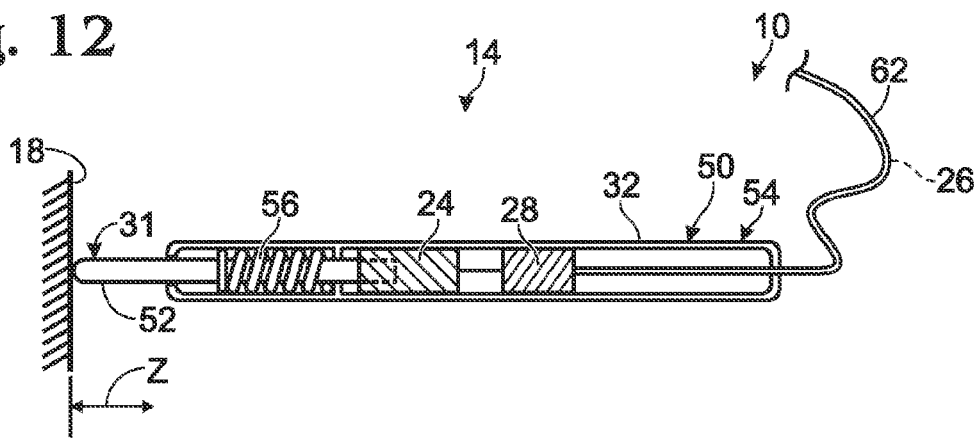
FIG. 12 is a somewhat schematic illustration of another illustrative, non-exclusive example of a computer input device according to the present disclosure in the form of a stylus shown with the stylus in a fully compressed configuration and together with an associated touch screen.

FIGS. 10-12 illustrate illustrative, non-excusive examples of computer input devices 10 according to the present disclosure that include input members 14 in the form of styluses 50. The styluses of FIGS. 10-12 may be described as examples of computer input devices, or portions thereof, that are schematically illustrated in FIG. 3. That is, the styluses of FIGS. 10-12 each include a first portion 31, in the form of a telescoping tip 52 that is configured to be manipulated in the x- and y-dimensions relative to base plane 18 (e.g., a touch screen), and a second portion 32, in the form of a stylus housing 54, that is configured to be manipulated in the z-dimension relative to the telescoping tip and thus relative to base plane 18. The stylus of FIG. 10 is illustrated as being in a fully extended configuration, the stylus of FIG. 11 is illustrated as being in an intermediate compressed configuration, and the stylus of FIG. 12 is illustrated as being in a fully compressed configuration. The styluses of FIGS. 10-12 are examples of computer input devices, or input members thereof, that may (but are not required to) include structure, such as detents, to enable user selection of a discrete stratum or plane from a plurality of strata or planes relative to the base plane.

As indicated in FIGS. 10-12, the illustrative, non-exclusive examples of styluses 50 may include a biasing device, such as (but not limited to) a spring 56. The biasing device biases the stylus to its fully extended configuration with the housing 54 being at a greatest distance relative to the base plane, and/or with the distal end of the telescoping tip 52 being at its greatest distance relative to housing 54. Styluses 50 also may include a detector 24 for detecting the relative position of the housing in the z-dimension. The illustrative, non-exclusive examples of styluses 50 of FIGS. 10-11 further include an internal power supply 58, an on/off button 60, and a transmitter 28 that is configured to send wireless signals 26. As such, these illustrative styluses may include one or more batteries, while the illustrative, non-exclusive example of stylus 50 of FIG. 11 includes a transmitter 28 that is configured to send signals 28 via a wire 62.

The stylus of FIG. 11 further illustrates optional buttons 64 that may be provided on styluses 50 according to the present disclosure for any suitable purpose. An illustrative, non-exclusive example of such a purpose is to receive user inputs that send corresponding input, or command, signals to the associated computing device. Another illustrative, non-exclusive example is to adjust and/or restrict relative movement of the housing of the stylus relative to the telescoping tip. This adjustment may, for example, include increasing or decreasing the scale, magnitude and/or effect of the relative translational movements and/or increasing or decreasing the force required to cause relative translational movement. As a further illustrative, non-exclusive example, at least one of the buttons may be used to restrict, or prevent, the biasing mechanism from biasing the stylus to its fully extended configuration, and/or to automatically return the stylus to a predefined starting, or nominal, configuration. While two such optional buttons are shown in FIG. 11, any suitable number(s) of such buttons 64 may be utilized, including no buttons, one button, or more than two buttons.

Other configurations of styluses are also within the scope of the present disclosure. For example, styluses according to the present disclosure may further include (but are not required to include) optional other structure for locking, or otherwise retaining, the housing of the stylus within one of a plurality of strata or planes relative to the telescoping tip of the stylus, regardless of user applied forces to the stylus that would otherwise cause the housing to move relative to the telescoping tip and thus between associated strata and/or planes. Additionally or alternatively, while illustrated with the telescoping tip 52 being received within the housing 54 of styluses 50, it is also within the scope of the present disclosure that the housing may be received within the tip of a stylus according to the present disclosure. That is, it is within the scope of the present disclosure that a telescoping tip may telescopically receive the housing, such that the housing translates at least partially within the telescoping tip when the housing is manipulated in the z-direction.

Figure 13:
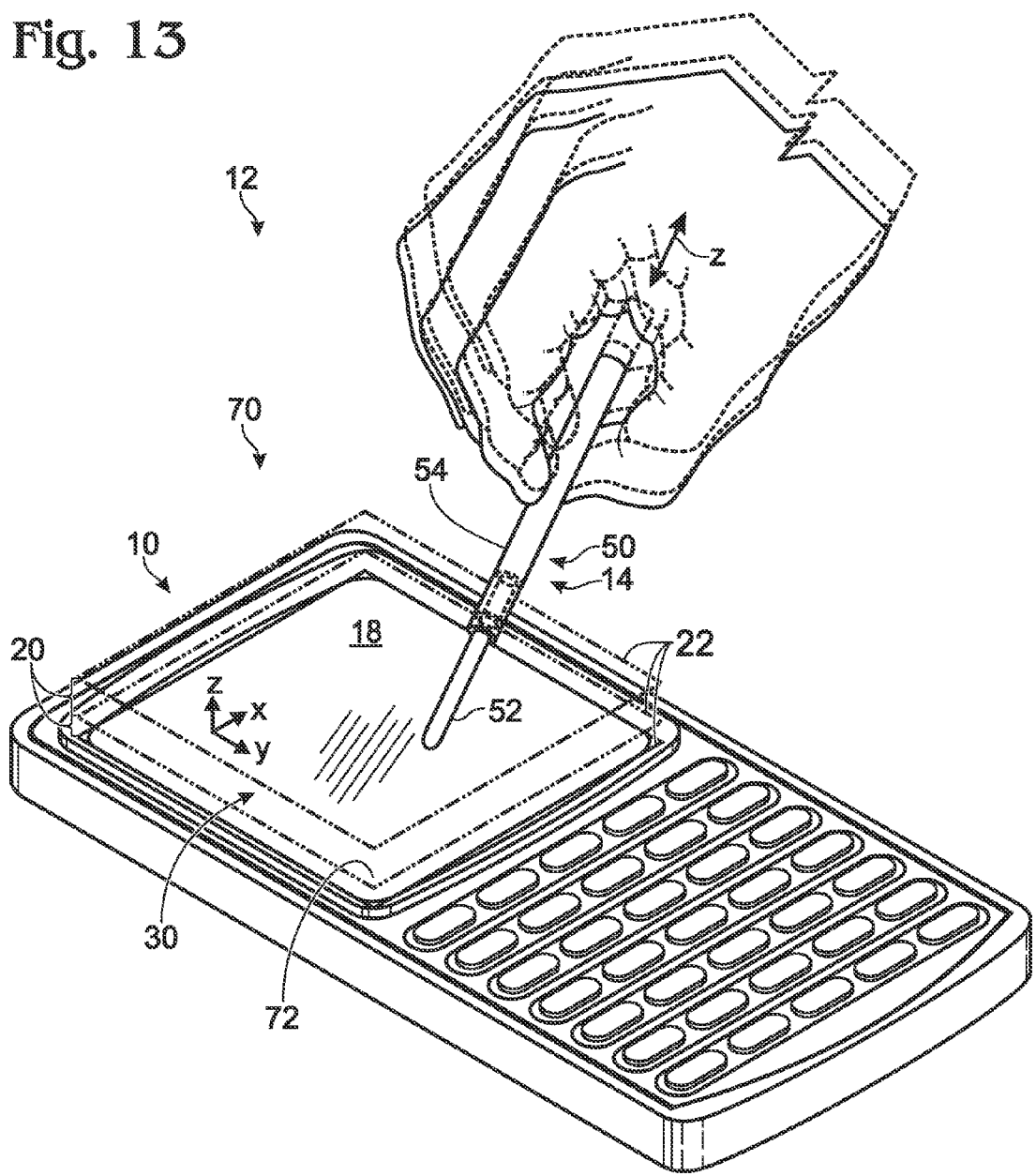
FIG. 13 is an illustration of an illustrative, non-exclusive example of a computing device according to the present disclosure in the form of a handheld computing device, the handheld computing device including an illustrative, non-exclusive example of a computer input device according to the present disclosure including a stylus and a touch screen, and schematically illustrating usage of the computer input device.

FIG. 13 illustrates an illustrative, non-exclusive example of a computing device 12 according to the present disclosure in the form of a handheld computing device 70 that incorporates a computer input device 10 according to the present disclosure, or portion thereof, in the form of a stylus 50, such as (but not limited to) one of the styluses illustrated in FIGS. 10-12. Accordingly, the computer input device of FIG. 13 may be described as an example of the computer input devices that are schematically illustrated in FIG. 3. The handheld computing device of FIG. 13 includes a display screen 30 in the form of a touch screen 72. As schematically illustrated, a user may move the housing 54 of the stylus relative to the telescoping tip 52 of the stylus and thus within and between a plurality of strata 20 spaced from the touch screen and/or along, within, or adjacent to a plurality of planes 22 spaced from the touch screen.

Figure 14:
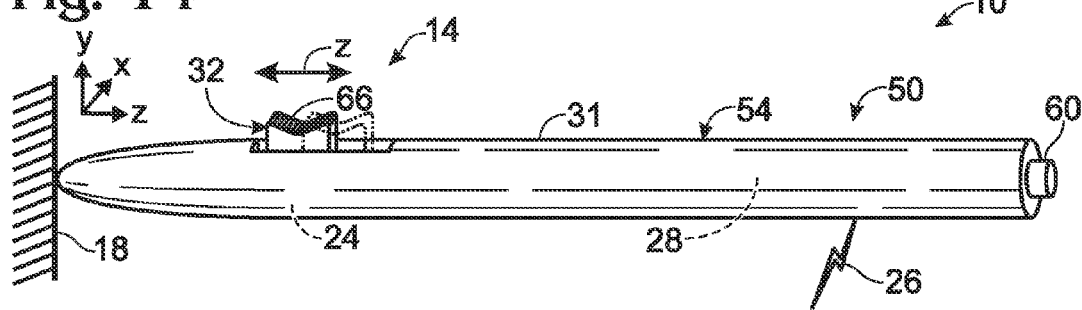
FIG. 14 is a somewhat schematic illustration of another illustrative, non-exclusive example of a computer input device according to the present disclosure in the form of a stylus.
Figure 15:
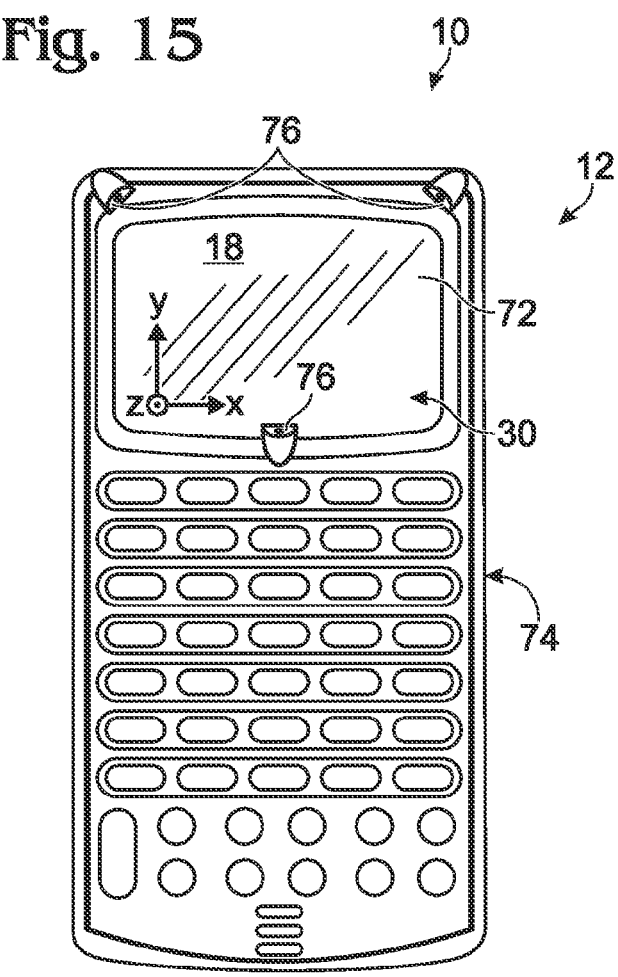
FIG. 15 is a top plan view of an illustrative, non-exclusive example of a computing device according to the present disclosure in the form of a handheld computing device, the handheld computing device including an illustrative, non-exclusive example of a computer input device according to the present disclosure that includes a plurality of proximity/distance sensors.
Figure 16:
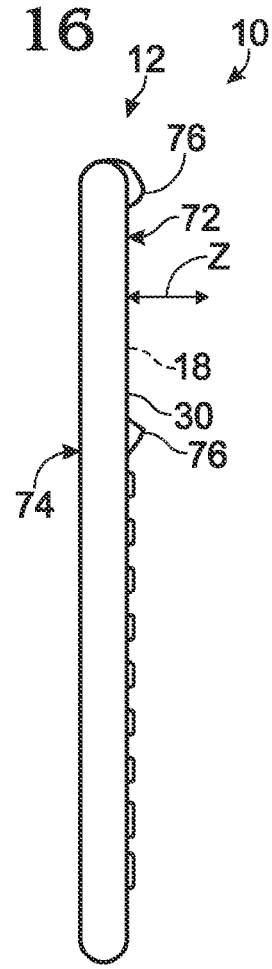
FIG. 16 is a side elevation view of the computing device of FIG. 15.

FIG. 14 illustrates yet another example of a computer input device according to the present disclosure in the form of a stylus 50. The stylus of FIG. 14, like the styluses of FIGS. 10-13 may be described as examples of computer input devices, or portions thereof, that are schematically illustrated in FIG. 3. The stylus of FIG. 14 includes a first portion 31, in the form of the stylus housing 54 that is configured to be manipulated in the x- and y-dimensions relative to base 18 (e.g., a touch screen), and a second portion 32, in the form of a slider 66 that is configured to be manipulated in the z-dimension relative to the stylus housing 54 and thus relative to base plane 18. Slider 66 may additionally or alternatively be referred to as a lever, a sliding lever, a sliding actuator, a sliding button, etc. Slider 66 is positioned and configured to receive a user's finger when the user is holding and manipulating the stylus, so that the user may manipulate the slider in the z-dimension as schematically illustrated in FIG. 14. The slider 66 is an example of a second portion 32 that may not (although may) be biased in the z-dimension, such as by a spring (e.g., spring 56 of FIGS. 10-12). Rather, a stylus may include structure that frictionally, or otherwise, enables the slider to remain in a selected position in the z-dimension upon positioning by a user, even when the user removes his/her finger from the slider. Other configurations are also within the scope of the present disclosure.

Figure 17:
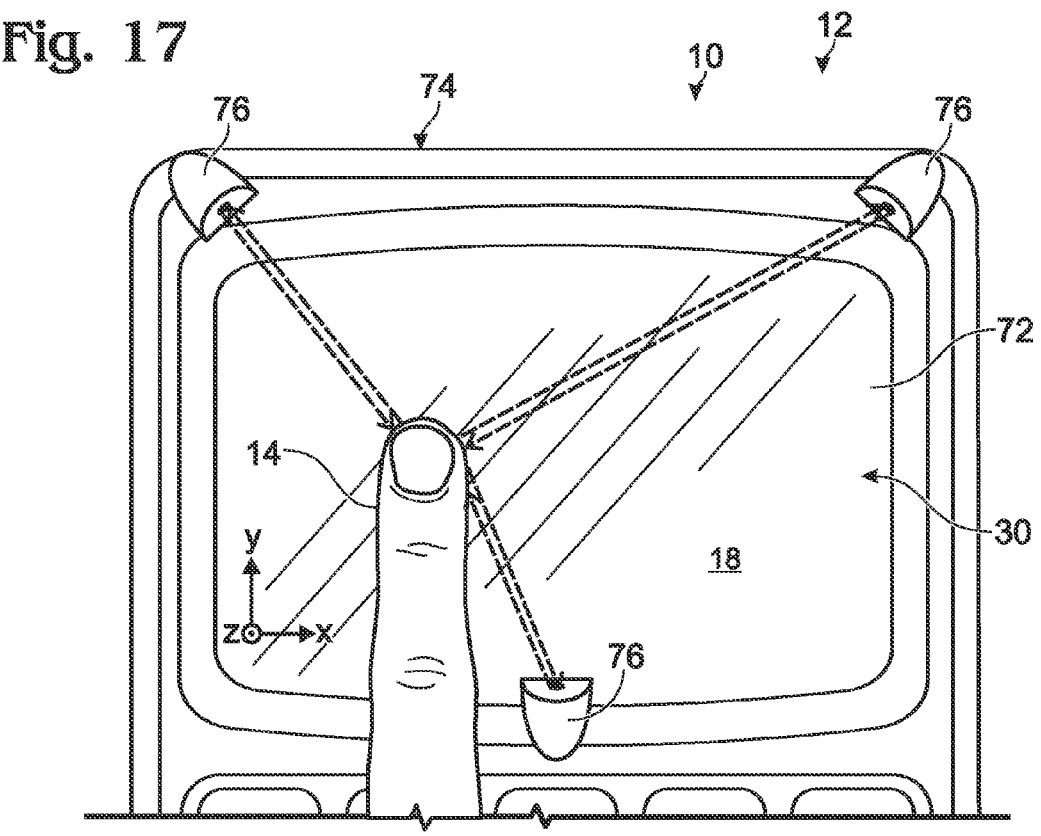
FIG. 17 is a fragmentary top plan view schematically illustrating an illustrative, non-exclusive example of usage of the handheld computing device and computer input device of FIGS. 15-16 with a human finger as an input member.
Figure 18:
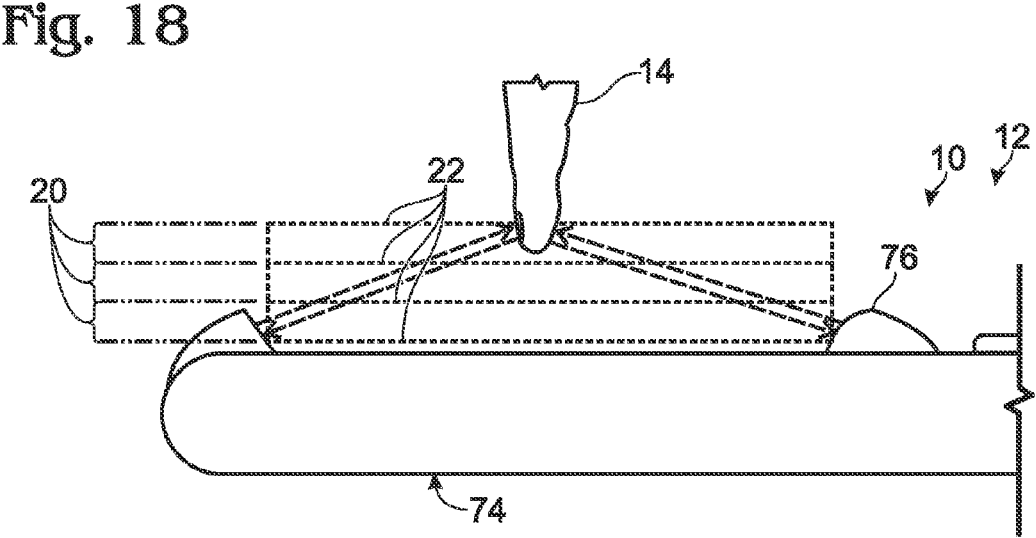
FIG. 18 is a fragmentary side elevation view of the computing device of FIG. 17, shown together with a human finger as an input member.
Figure 19:
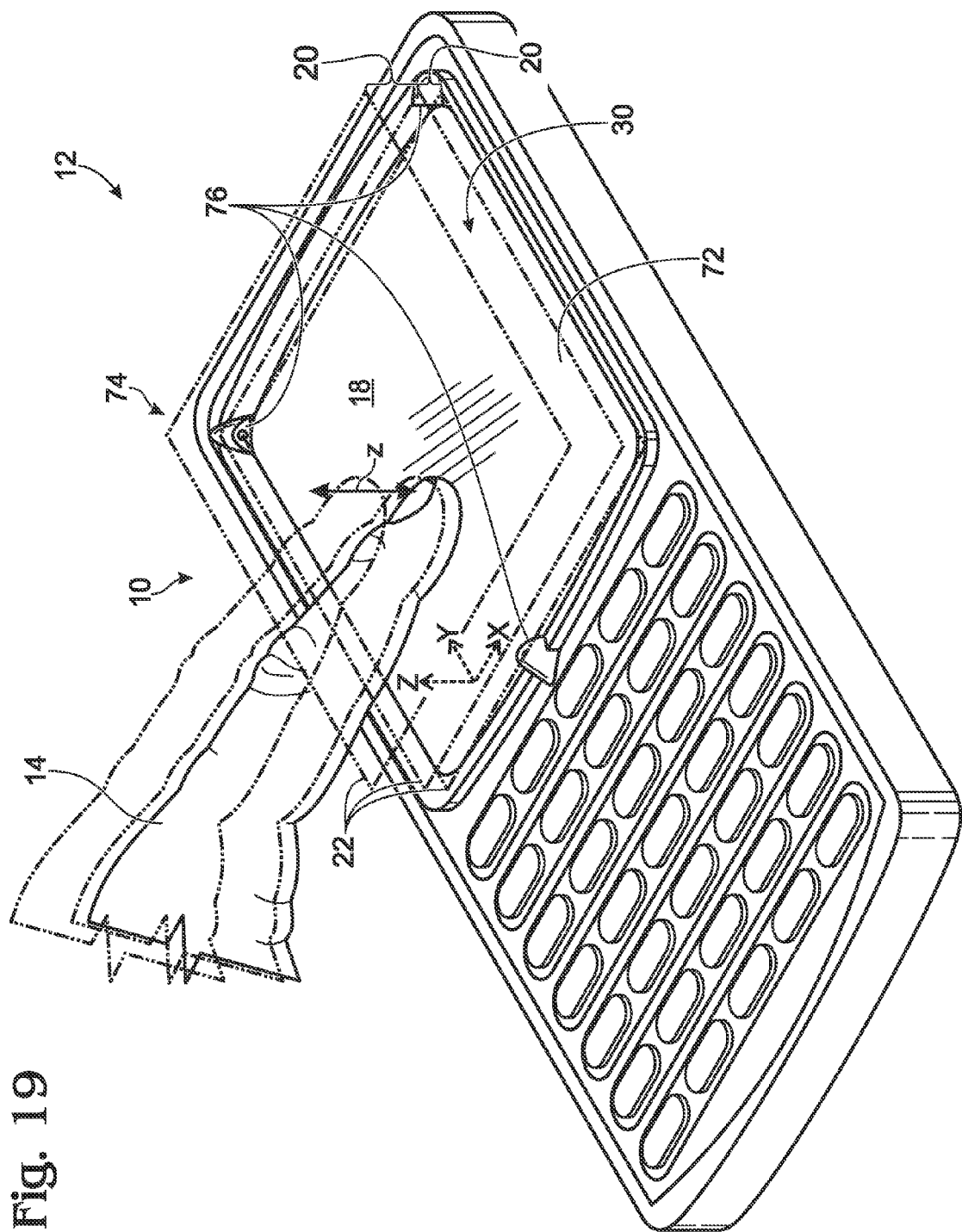
FIG. 19 is an isometric view of the computing device of FIG. 17, shown together with a human finger as an input member.

FIGS. 15-19 illustrate another illustrative, non-exclusive example of a computing device 12 according to the present disclosure in the form of a handheld computing device 74. The handheld computing device of FIGS. 15-19 may be described as including an example of the computer input devices schematically illustrated in FIG. 2. Handheld computing device 74 includes a plurality of proximity and/or distance sensors 76 that are positioned adjacent to a display screen 30 in the form of a touch screen 72. Distance sensors 76 may be described as, or as portions and/or components of, a detector 24 according to the present disclosure. Each distance sensor 76 is adapted to detect a distance from the respective distance sensor to at least a portion of an input member 14, such as schematically illustrated in FIGS. 17-18 by the dashed arrows extending to and from the distance sensors with respect to the input member 14. FIGS. 17-19 illustrate an input member in the form of a human finger; however, any suitable input members may be used, including (but not limited to) styluses, pens, pencils, etc. As perhaps best illustrated in FIGS. 18-19, a user may move his/her finger, or other input member 14, relative to the touch screen and thus within and between a plurality of strata 20 spaced from the touch screen and/or along, within, or adjacent to a plurality of planes 22 spaced from the touch screen.

Figure 20:
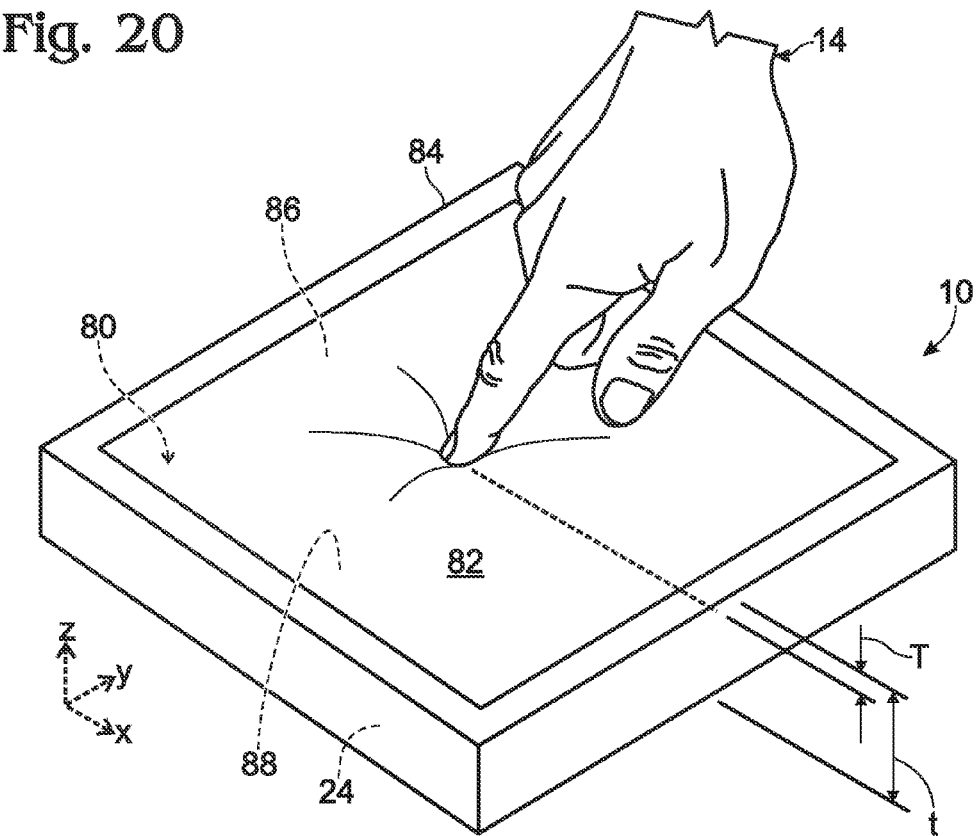
FIG. 20 is a somewhat schematic illustration of another illustrative, non-exclusive example of a computer input device according to the present disclosure including a volume of fluid and a flexible touch screen, shown together with a human hand as an input member.

FIG. 20 somewhat schematically illustrates another illustrative, non-exclusive example of a computer input device 10 according to the present disclosure, such as may be used with or implemented with a computing device according to the present disclosure. The computer input device of FIG. 20 includes a volume of fluid 80 having a thickness, t, and a flexible touch screen 82 adjacent to and covering the volume of fluid within a housing 84. The computer input device of FIG. 20 also includes a detector 24 that is adapted to detect a depth in which a portion of the flexible touch screen is pressed into the volume of fluid by an input member, such as by a human finger or stylus. Accordingly, the computer input device of FIG. 20 may detect manipulation of an input member in the x-, y-, and z-dimensions relative to a base plane. The depth, or reduction in thickness T of the volume of fluid, may be sensed by detecting the pressure 86 of the volume of fluid. Additionally or alternatively, the depth may be sensed by detecting the opacity 88 of the volume of fluid, for example, at a position corresponding to engagement of the flexible touch screen by the input member. Additionally or alternatively, the depth may be sensed by detecting a distance between the flexible touch screen and a plane that is adjacent to the volume of fluid and opposing the flexible touch screen, such as by a distance sensor. Other configurations are also within the scope of the present disclosure. The touch screen of such examples also may (but are not required to) be display screens. Other compressible and/or displaceable media may be used in addition or in place of the above-discussed fluid.

Figure 21:
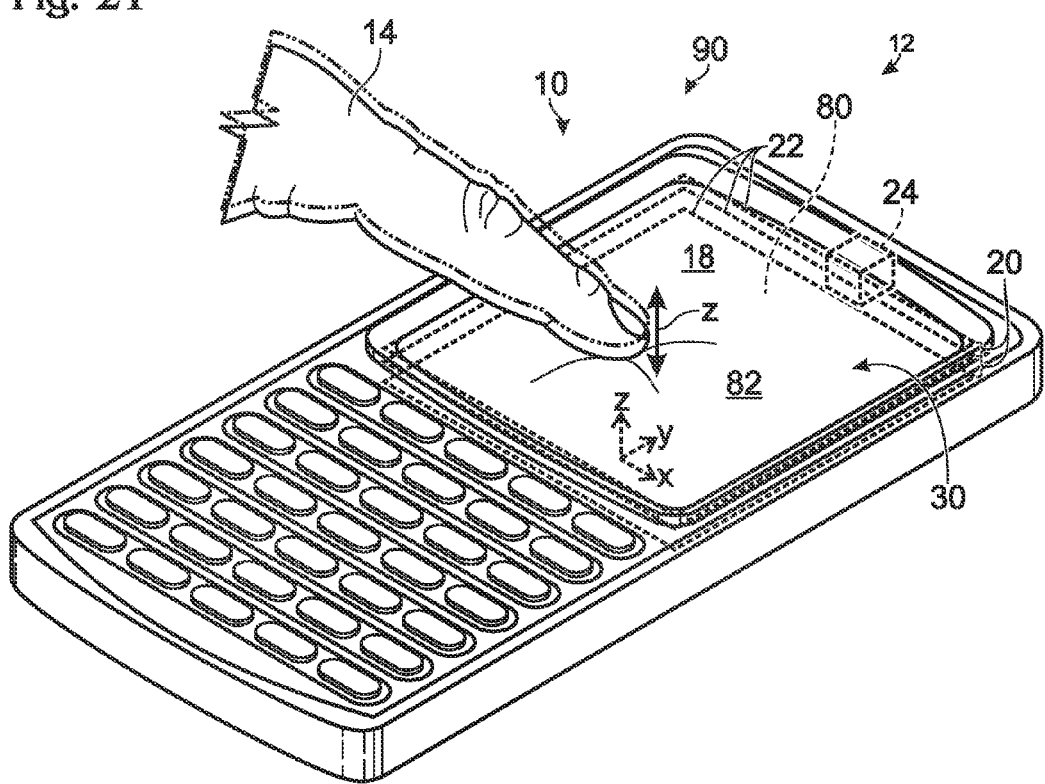
FIG. 21 is an illustration of an illustrative, non-exclusive example of a computing device according to the present disclosure in the form of a handheld computing device, the handheld computing device including an illustrative, non-exclusive example of the computer input device schematically illustrated in FIG. 20, and schematically illustrating usage of the computer input device with a human finger as an input member.

FIG. 21 illustrates an illustrative, non-exclusive example of a computing device 12 according to the present disclosure in the form of a handheld computing device 90. Handheld computing device 90 includes the example of a computer input device 10 schematically illustrated in FIG. 20. As schematically illustrated in FIG. 21, a user may move his/her finger on the flexible touch screen 82 while applying varying pressures to the flexible touch screen, and thus within and between a plurality of strata 20 spaced from a base plane and/or along, within, or adjacent to a plurality of planes 22 spaced from a base plane 18. A detector 24 detects the depth in which a portion of the flexible touch screen is pressed into the volume of fluid by the input member (e.g., the user's finger).

Figure 22:
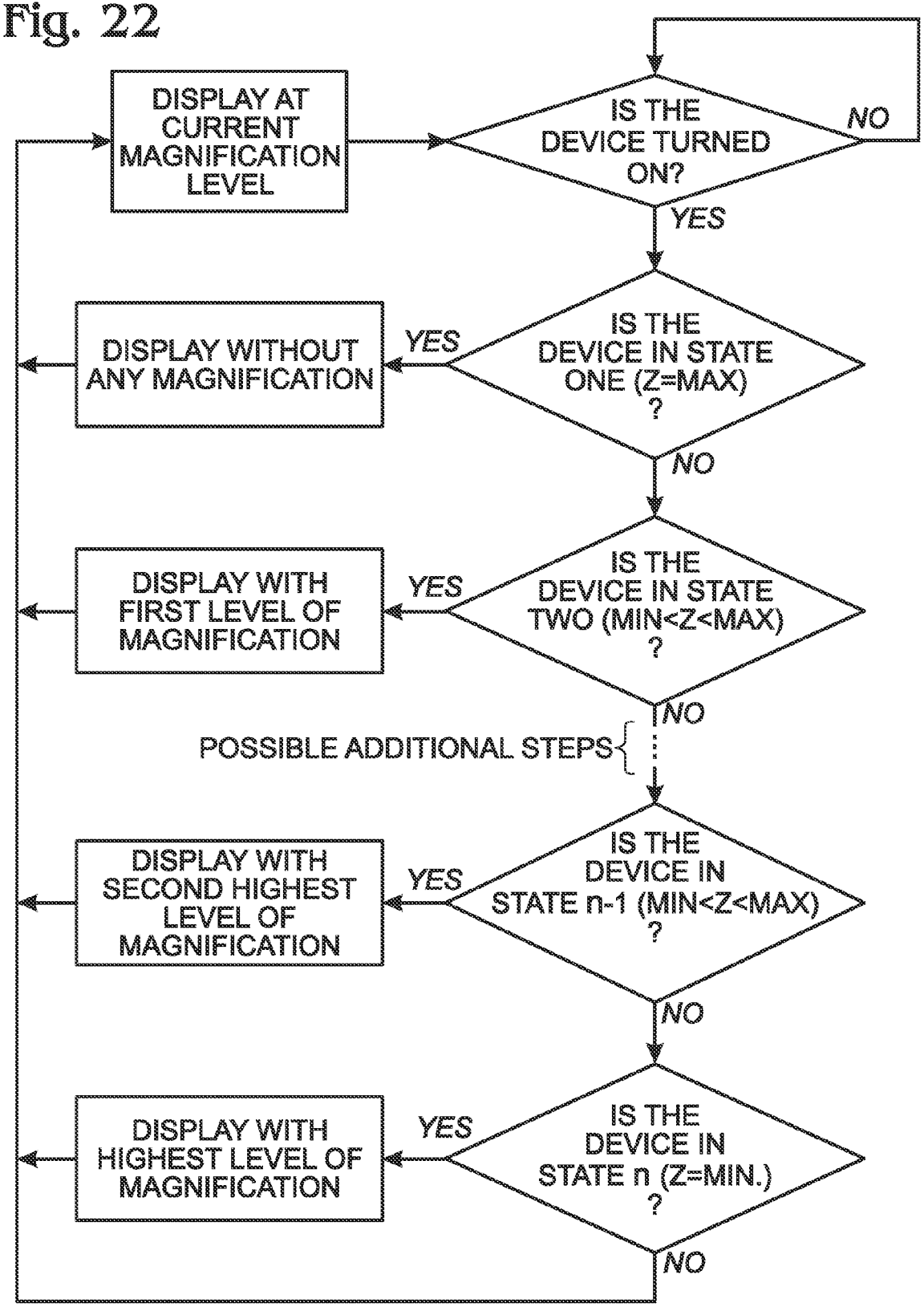
FIG. 22 is a schematic diagram of an illustrative, non-exclusive example of methods according to the present disclosure.

FIG. 22 schematically illustrates a non-exclusive example of methods according to the present disclosure, the methods including usage of an illustrative, non-exclusive example of a computer input device 10 according to the present disclosure. The illustrated methods include displaying manipulation of indicia on a display screen based at least in part on the z-position of an input member of an input device according to the present disclosure relative to a base plane. More specifically, and with respect to the illustrative, non-exclusive example of FIG. 22, the manipulation of indicia on the display screen corresponds to the level of magnification, or zoom, of the displayed indicia. For example, starting at the decision box in the upper right portion of FIG. 22, if the computer input device 10, or associated computing device 12, is turned on, the method queries the state of the computer input device with respect to the x-axis. If the device is in a first state, such as with Z at a maximum value, then the indicia on the display screen may be displayed without any magnification, or at a baseline level of magnification. If the device is in a second state, such as with Z at a value less than its maximum value, but greater than a minimum value, the indicia may be displayed at a first level of magnification greater than the baseline level of magnification. As schematically illustrated in FIG. 22, such a method may include any number of suitable steps, with a baseline magnification and a highest level of magnification, with any suitable number of levels there between. Other methods may be implemented with computer input devices according to the present disclosure, as discussed herein, and the illustration of the methods of FIG. 22 is provided as one example only. For example, while FIG. 22 illustrates the correlation of the increase in the magnification of indicia on a display with the decrease in the value of Z, a similar method may embody a correlation of the decrease in magnification with the decrease in the value of Z. As an illustrative, non-excusive example, consider the styluses of FIGS. 10-12. When used according to a method of FIG. 22, when a user translates the housing of the stylus toward the base plane so that the telescoping tip translates further into the housing, the indicia on an associated display screen may be magnified. On the other hand, it is within the scope of the present disclosure, that when a user translates the housing of the stylus toward the base plane so that the telescoping tip translates further into the housing, the indicia on an associated display screen may be decreased in size.

Figure 23:
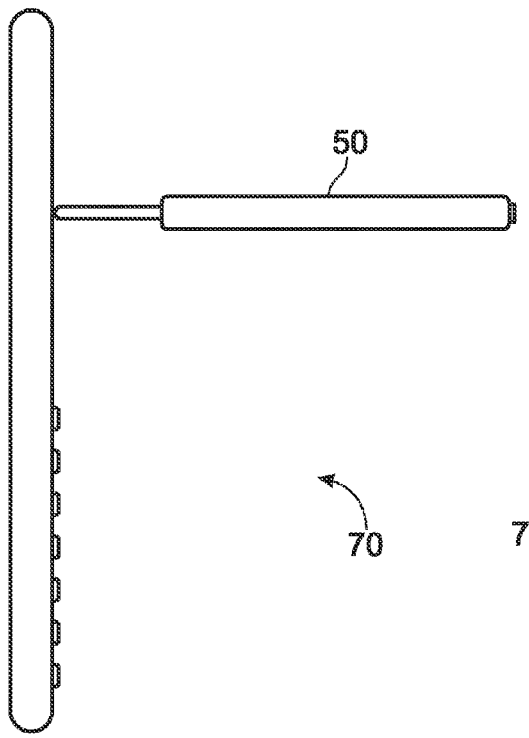
FIG. 23 is a side elevation view an illustrative, non-exclusive example of a computing device according to the present disclosure in the form of a handheld computing device, the handheld computing device including an illustrative, non-exclusive example of a computer input device according to the present disclosure that includes a stylus.
Figure 24:
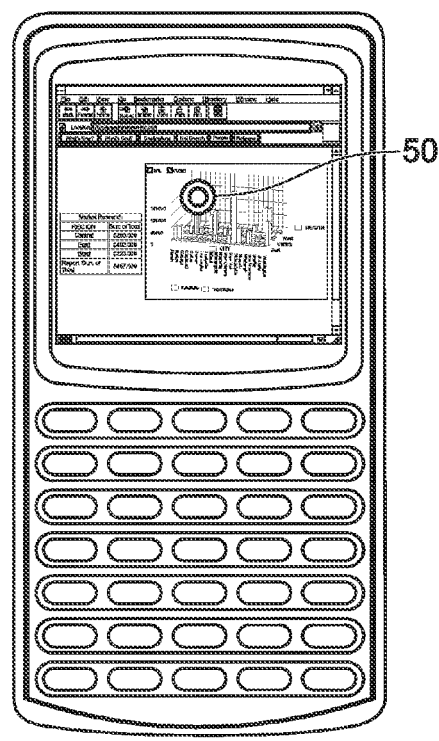
FIG. 24 is a top plan view the computing device of FIG. 23.
Figure 25:
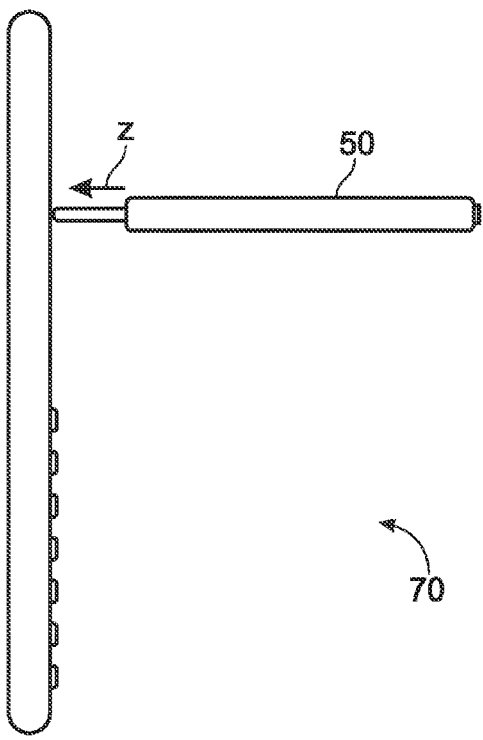
FIG. 25 is a side elevation view of the computing device of FIG. 23 with the housing of the stylus translated, relative to the tip of the stylus, toward the handheld computing device.
Figure 26:
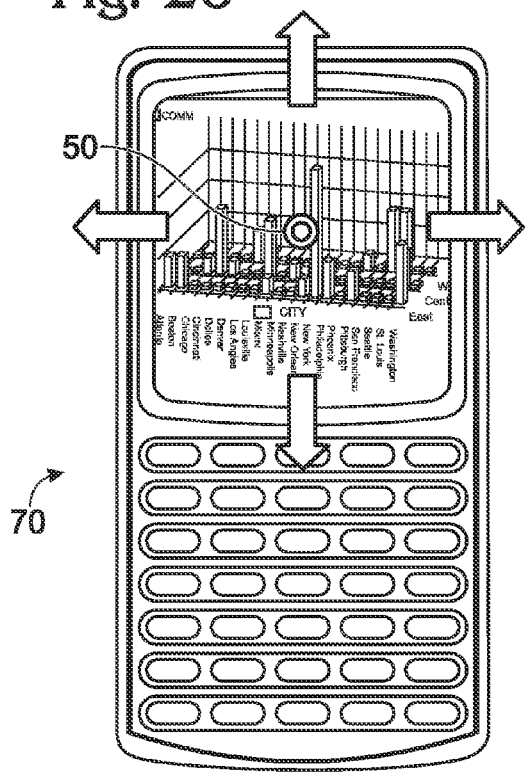
FIG. 26 is a top plan view of the computing device of FIG. 25 showing an illustrative, non-exclusive effect of translating the housing of the stylus toward the handheld computing device, relative to the tip of the stylus.

FIGS. 23-26 schematically illustrate an illustrative, non-exclusive example of an implementation of the method of FIG. 22, with the method being associated with a stylus 50 in conjunction with a handheld computing device 70. Specifically, FIGS. 23 and 24 illustrate a handheld computing device together with an associated stylus in a first configuration. In FIGS. 23 and 24, the display screen of the handheld computing device is displaying an application at a given magnification, or zoom level. FIGS. 25 and 26 illustrate the stylus in a second configuration in which the stylus is in a state of greater compression (i.e., the housing of which has been translated in the z-dimension toward the display screen) relative to the first configuration. In FIGS. 25 and 26, the display screen is displaying the application at a magnification, or zoom level, greater than that displayed with the stylus in the first configuration.

Figure 27:
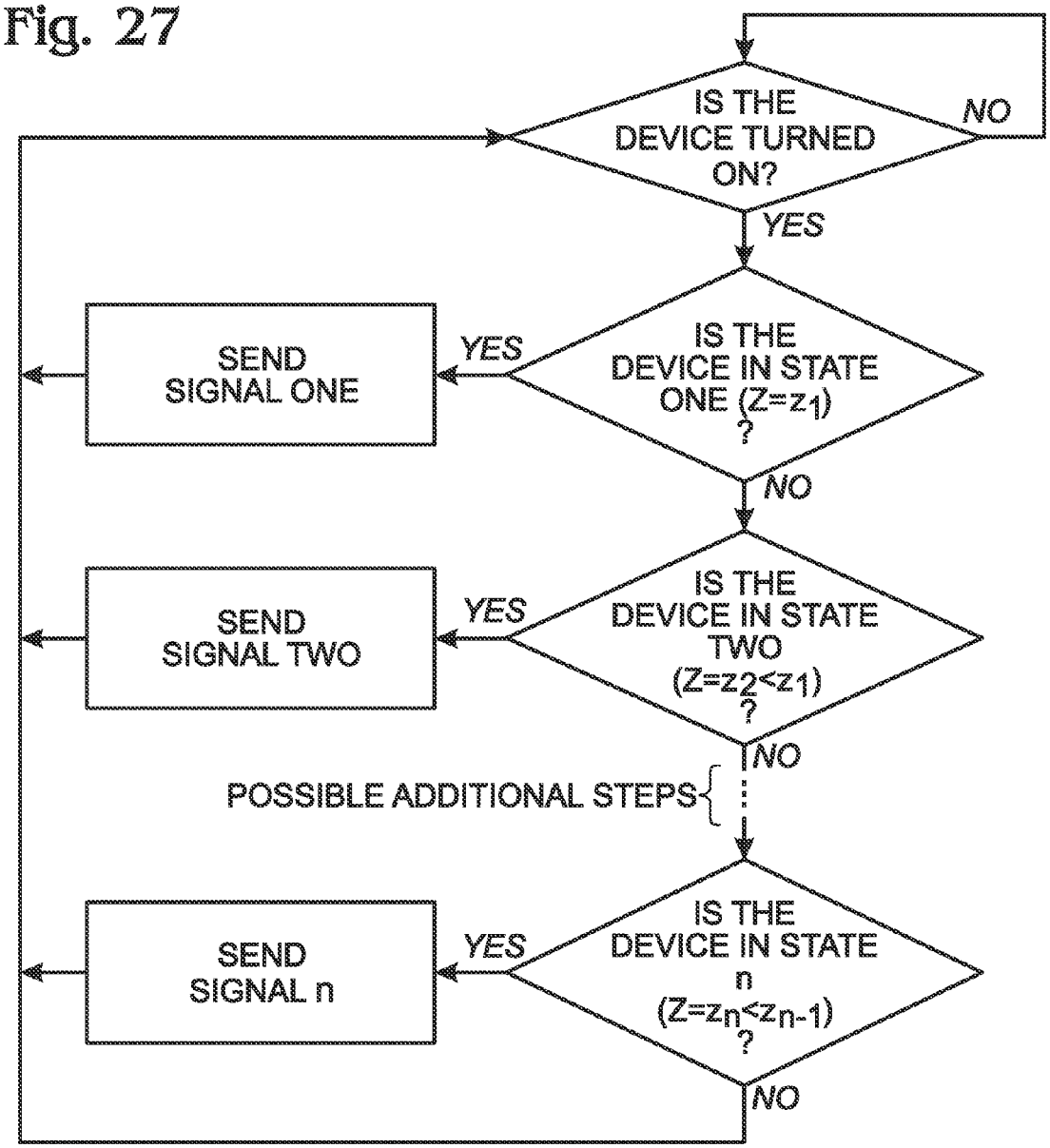
FIG. 27 is a schematic diagram of illustrative, non-exclusive examples of methods according to the present disclosure.

The method of FIG. 22 and the implementation thereof of FIGS. 23-26 schematically illustrate but one example of using computer input devices according to the present disclosure, and many other uses are also within the scope of the present disclosure. As an illustrative, non-exclusive example, FIG. 27 schematically illustrates methods according to the present disclosure, the methods including usage of a computer input device 10 according to the present disclosure. The illustrated methods include sending of signals, by a computer input device, associated with a plurality of respective states of the computer input device, such as based at least in part on the z-position of an input member of an input device according to the present disclosure relative to a base plane. More specifically, and with respect to the illustrative, non-exclusive example of FIG. 27, the input device sends a first signal when the device is in a first state, a second signal when the device is in a second state, and an nth signal when the device is in an nth state, with the respective states corresponding to relative positions of an input member in the z-dimension. The signals, when received by an associated computing device, may be used to control predetermined aspects of the associated computing device, including (but not limited to) the display of indicia on a display screen, the control of software applications, the control of a cursor, etc.

The following discussion recites several illustrative, non-exclusive examples of uses and/or implementations of computer input devices according to the present disclosure.

A computer input device according to the present disclosure may be implemented for use with graphic software applications, such as (but not limited to) the ADOBE PHOTOSHOP® application. A user may define attributes associated with one or more of the plurality of strata or planes. Such attributes may include (but are not limited to) magnification or zoom levels, drawing tool selection (e.g., paintbrush, eraser, pencil, etc.), and manipulation tools (e.g., pan tool, rotation tool, etc.). Accordingly, a user may easily switch between various tools and/or other attributes of the application by simply moving the input member between the plurality of strata or planes. Such a configuration may eliminate the need for a user to input key strokes or click on different and specific tools on the desktop, and thus the productivity of the user may be greatly increased.

Additionally or alternatively, a computer input device 10 according to the present disclosure may be implemented so that a predetermined speed of cursor movement, scroll, or pan within a window or screen of an application, or other such attribute of a software application, and the display, or manipulation, of indicia, or content, on a display screen is assigned to a given stratum or plane. For example, the slowest cursor movement, etc. may be assigned to the lowest strata or plane (relative to the base plane), and the fastest cursor movement, etc. may be assigned to the highest strata or plane (relative to the base plane), or vice versa. Accordingly, a user may switch between cursor, pan, or scroll speeds, etc. simply by moving the input member between the plurality of strata or planes.

Additionally or alternatively, a computer input device 10 according to the present disclosure may be implemented so that a predetermined window, tab, sub-window, or the like (e.g., when more than one window within a word processing, web browsing, spreadsheet, etc. application are open, or when a single window includes more than one tab of content of a word processing, web browsing, spreadsheet, etc. application) is assigned to a predetermined strata or plane associated with the computer input device. Accordingly, a user may switch between windows or tabs simply by moving the input member between the plurality of strata or planes.

Additionally or alternatively, a computer input device 10 according to the present disclosure may be implemented so that one or more of the plurality of strata or planes is assigned to one of a plurality of software applications. Accordingly, a user may switch between operation of software applications simply by moving the input member between the plurality of strata or planes. Such software applications may include applications within a single operating system, between more than one operating system, between applications within more than one operating system, etc.

Additionally or alternatively, a computer input device 10 according to the present disclosure may be implemented so that one or more of the plurality of strata or planes is assigned to one of a plurality of display screens (e.g., monitors) associated with a computing device (e.g., a personal computer). Accordingly, a user may switch between display screens simply by moving the input member between the plurality of strata or planes.

Additionally or alternatively, a computer input device 10 according to the present disclosure may be implemented so that one or more of the plurality of strata or planes is assigned to predetermined gesture controls associated with a software application. For example, a predetermined gesture such as manipulation of the input member in a circular motion, in a rapid back and forth motion, etc. may be assigned to a task within the software application such as to undo, repeat, switch windows, switch tabs, mute, volume up, volume down, etc.

Additionally or alternatively, a computer input device 10 according to the present disclosure may be implemented to function in conjunction with a three-dimensional display device, such as a holographic display device. The three-dimensional aspect of the computer input devices according to the present disclosure may directly correspond to the three-dimensional display of indicia on the three-dimensional display device.

Additionally or alternatively, a computer input device 10 according to the present disclosure may be implemented with gaming software applications. Illustrative, non-exclusive examples of implementation may include (but are not limited to) use of multiple input members to control more than one aspect of a game, such as the feet and/or hands of a virtual character (e.g., a skateboarder, surfer, snowboarder, athlete, billiard player, etc.); use of an input member to control a ball, such as the spin on a ball (e.g., a pool ball, soccer ball, basketball, etc.); use of an input member to control the three-dimensional movement of a virtual character, such as up and down ladders, jumping, running or walking, etc.; use of an input member to control both movement of a virtual character and additional attributes associated with the character (e.g., reloading a weapon, changing a weapon, casting a spell, defending the character, etc., such as may be used in a first-person shooter-type game). Other gaming applications for computer input devices according to the present disclosure are also within the scope of the present disclosure.

Additionally or alternatively, a computer input device 10 according to the present disclosure may be configured to permit a user to wear a glove or gloves when the input member is the user's hand or finger. Handheld computing devices often incorporate touch screens that rely on electrical contact between human skin and the touch screen. A computing device that incorporates a computer input device according to the present disclosure, such as that includes a plurality of distance sensors adapted to detect a distance from the respective distance sensor to at least a portion of an input member, would allow user input while not necessarily requiring direct contact between human skin and a touch screen. Examples of situations where such a computer input device may be useful include clean room environments (e.g., computer chip fabs, etc.), medical facilities (e.g., hospitals, operating rooms, etc.), cold environments, etc.

Additionally or alternatively, a computer input device 10 and/or an associated computing device according to the present disclosure may be programmable such that a user may assign attributes to one or more of the plurality of strata or planes associated with the computer input device, including (but not limited to) any of the attributes discussed herein.

Implementation of computer input devices 10 according to the present disclosure, associated computing devices, and/or methods according to the present disclosure may be described in terms of software, computer readable media, computer readable storage media, machine readable media, etc. that include, or embody, computer-executable instructions that, when executed, direct an associated computing device to perform functions, aspects, methods, etc. according to the present disclosure. In some embodiments, a computer input device and/or an associated computing device according to the present disclosure may be described as a particular machine that is specifically configured to carry out a specific (non-trivial, non-conventional) process or method according to the present disclosure. Additionally or alternatively, a computer input device and/or an associated computing device according to the present disclosure may be described as configured to transform an article (such as, but not limited to, computer memory, electronics, a display device, etc.) from one state to another.

The following enumerated paragraphs represent illustrative, non-exclusive descriptions of methods, systems, devices, software, etc. according to the present disclosure.

A A method for displaying, by a display device, manipulation of indicia based at least in part on detecting movement of an input member, the method comprising:

detecting, by a computer input device, user-imparted relative movement of the input member in x-, y-, and z-dimensions relative to a base point in a base plane.

A1 The method of paragraph A, wherein the input member includes a stylus, or optionally, a portion of a stylus.

A2 The method of paragraph A, wherein the input member includes a mouse, or optionally, a portion of a mouse.

A3 The method of any of paragraphs A-A2, wherein the detecting includes:

detecting user-imparted relative movement of a first portion of the input member in the x- and y-dimensions relative to the base point in the base plane; and detecting user-imparted relative movement of a second portion of the input member in the z-dimension relative to the base plane.

A4 The method of paragraph A, wherein the input member is or optionally includes, a human hand.

A4.1 The method of paragraph A4, wherein the detecting does not include sensing contact between the human hand and the computer input device.

A5 The method of any of paragraphs A-A4.1, wherein the computer input device includes a touch-sensitive screen.

A5.1 The method of paragraph A5, wherein the base plane corresponds to the touch-sensitive screen.

A5.2 The method of paragraph A5, wherein the base plane is above the touch-sensitive screen.

A5.3 The method of paragraph A5, wherein the base plane is below the touch-sensitive screen.

A5.4 The method of any of paragraphs A5-A5.3, wherein the touch-sensitive screen is the display device.

A6 The method of any of paragraphs A-A5.4, wherein the detecting includes:

detecting relative movement of at least a portion of the input member in the x- and y-dimensions relative to the base point; and detecting a position of at least a portion of the input member within a set of discrete strata of space, each stratum spaced away from the base plane in the z-dimension.

A6.1 The method of paragraph A6, further comprising:

sending a first signal when a given portion of the input member is within a first stratum; and sending a second signal when the given portion of the input member is within a second stratum, wherein the second stratum is spaced further away from the base plane than the first stratum.

A7 The method of any of paragraphs A-A6.1, wherein the computer input device includes a volume of fluid and a flexible touch screen adjacent to and covering at least a portion of the volume of fluid, wherein the flexible touch screen is adapted to be engaged by the input member; and wherein the detecting includes detecting a depth in which a portion of the flexible touch screen is pressed into the volume of fluid by the input member.

A7.1 The method of paragraph A7, wherein the detecting a depth includes detecting a pressure of the volume of fluid.

A7.2 The method of paragraph A7, wherein the detecting a depth includes detecting a thickness of the volume of fluid at a position corresponding to engagement of the flexible touch screen by the input member.

A7.2.1 The method of paragraph A7.2, wherein the detecting a thickness includes detecting the opacity of the volume of fluid at the position corresponding to engagement of the flexible touch screen by the input member.

A7.2.2 The method of paragraph A7.2, wherein the detecting a thickness includes detecting a distance between the flexible touch screen and a plane that is adjacent to the volume of fluid and opposing the flexible touch screen.

A8 The method of any of paragraphs A-A7.2.2, wherein the computer input device includes a volume of fluid and a flexible touch screen adjacent to and covering at least a portion of the volume of fluid, wherein the flexible touch screen is adapted to be engaged by the input member; and wherein the detecting includes detecting a plurality of thicknesses of the volume of fluid across the x- and y-dimensions of the base plane.

A9 The method of any of paragraphs A-A8, further comprising:

performing a computing operation responsive to the detecting.

A10 The method of any of paragraphs A-A9, further comprising:

displaying, by a display device, manipulation of indicia based at least in part on the detecting user-imparted relative movement of the input member.

A10.1 The method of paragraph A10, wherein the displaying includes:

enlarging the indicia based at least in part on sensing relative movement of at least a portion of the input member in the z-dimension toward the base plane.

A10.2 The method of any of paragraphs A10-A10.1, wherein the displaying includes:

shrinking the indicia based at least in part on sensing relative movement of at least a portion of the input member in the z-dimension away from the base plane.

A10.3 The method of paragraph A10, wherein the displaying includes:

Shrinking the indicia based at least in part on sensing relative movement of at least a portion of the input member in the z-dimension toward the base plane, A10.4 The method of any of paragraphs A10 and A10.3, wherein the displaying includes:

enlarging the indicia based at least in part on sensing relative movement of at least a portion of the input member in the z-dimension away from the base plane.

A10.5 The method of paragraph A10, wherein the displaying includes:

displaying manipulation of the indicia according to a first attribute based at least in part on sensing relative movement of a portion of the input member in the x- and y-dimensions when the portion of the input member is a first distance away from the base plane in the z-dimension; and displaying manipulation of the indicia according to a second attribute based at least in part on sensing relative movement of the portion of the input member in the x- and y-dimensions when the portion of the input member is a second distance away from the base plane in the z-dimension.

A10.5.1 The method of paragraph A10.5, wherein the first attribute includes a first ratio of distance of movement of the portion of the input member in the x- and y-dimensions to distance of movement of the indicia on the display screen; and wherein the second attribute includes a second ratio of distance of movement of the portion of the input member in the x- and y-dimensions to distance of movement of the indicia on the display screen.

A10.5.2 The method of paragraph A10.5, wherein the first attribute includes the appearance of the indicia, and wherein the second attribute includes the disappearance of the indicia.

A10.6 The method of paragraph A10, wherein the displaying includes:

displaying manipulation of indicia within a first window of a software application when a portion of the input member is a first distance away from the base plane; and displaying manipulation of indicia within a second window of the software application when the portion of the input member is a second distance away from the base plane.

A10.7 The method of paragraph A, wherein the displaying includes:

displaying manipulation of indicia within a window of a first software application when a portion of the input member is a first distance away from the base plane; and displaying manipulation of indicia within a window of a second software application when the portion of the input member is a second distance away from the base plane.

A10.7.1 The method of paragraph A10.7, wherein the first software application is a first computer operating system and the second software application is a second computer operating system.

A11 The method of any of paragraphs A-A9, further comprising:

when a portion of the input member is a first distance away from the base plane, displaying, on a first display device, manipulation of indicia based at least in part on the detecting user-imparted relative movement of the input member; and when the portion of the input member is a second distance away from the base plane, displaying, on a second display device, manipulation of indicia based at least in part on the detecting user-imparted relative movement of the input member.

A12 The method of any of paragraphs A-A11, further comprising:

detecting, by the computer input device, user-imparted movement of a second input member in x-, y-, and z-dimensions relative to the base point.

A12.1 The method of paragraph A, further comprising:

displaying, by a display device, manipulation of indicia based at least in part on the detecting user-imparted relative movement of the second input member;

wherein the detecting user-imparted relative movement of the second input member occurs simultaneously with the detecting user-imparted relative movement of the input member.

A13 The method of any of paragraphs A-A9, further comprising:

displaying, by a display device, manipulation of indicia based at least in part on the detecting user-imparted relative movement of the input member when a portion of the input member is a first distance from the base plane; and controlling a predetermined aspect of an associated computing device when the portion of the input member is a second distance from the base plane, wherein the predetermined aspect does not include the display of manipulation of indicia based at least in part on the detecting user-imparted relative movement of the input member.

B A computing device configured to perform the method of any of paragraphs A-A13.

C A computer input device, comprising:

a detector adapted to detect relative movement of at least a portion of an input member in x-, y-, and z-dimensions relative to a base point in a base plane; and a controller adapted to send a signal to an associated computing device based at least in part on the relative movement of the input member.

C1 The computer input device of paragraph C,
wherein the detector includes:
a first detector adapted to detect relative movement of a first portion of the input member in the x- and y-dimensions relative to the base point;
a second detector adapted to detect relative movement of a second portion of the input member in the z-dimension relative to the base point; and
wherein the controller is adapted to send a first signal to the associated computing device based at least in part on the relative movement of the first portion in the x- and y-dimensions relative to the base point, and further wherein the controller is adapted to send a second signal to the associated computing device based at least in part on the relative movement of the second portion in the z-dimension relative to the base point.

C2 The computer input device of any of paragraphs C-C1,
wherein the detector includes a plurality of distance sensors, wherein each distance sensor is adapted to detect a distance from the respective distance sensor to the at least a portion of the input member.

C3 The computer input device of any of paragraphs C-C2,
wherein the input member includes a stylus, or optionally, a portion of a stylus.

C4 The computer input device of any of paragraphs C-C2,
wherein the input member includes a mouse, or optionally, a portion of a mouse.

C5 The computer input device of any of paragraphs C-C4,
wherein the input member includes a first portion, and wherein the detector is adapted to detect relative movement of the first portion of the input member in the x- and y-dimensions relative to the base point; and
wherein the input member includes a second portion, and wherein the detector is adapted to detect relative movement of the second portion of the input member in the z-dimension relative to the base point.

C5.1 The computer input device of paragraph C5, wherein the input member includes a mouse, or optionally, a portion of a mouse, wherein the mouse includes a base portion and a finger-receiving portion, wherein the first portion of the input member includes the base portion, wherein the second portion of the input member includes the finger-receiving portion, wherein the finger-receiving portion defines a finger-receiving region adapted to receive a user's finger for manipulation of the finger-receiving portion in the z-dimension relative to the base portion, wherein the finger-receiving portion is slidingly supported relative to the base portion.

C5.2 The computer input device of paragraph C5, wherein the input member includes a stylus, or optionally, a portion of a stylus, wherein the stylus includes a stylus housing and a slider, wherein the first portion of the input member includes the stylus housing, wherein the second portion of the input member includes the slider, wherein the slider is adapted to receive a user's finger for manipulation of the slider in the z-dimension relative to the stylus housing, wherein the slider is slidingly supported relative to the stylus housing.

C6 The computer input device of any of paragraphs C-C2, wherein the input member is a human hand, or portion of a human hand, such as a thumb or finger(s).

C7 The computer input device of any of paragraphs C-C6, wherein the detector is adapted to not require sensing of contact between the input member and the computer input device to detect relative movement of the input member.

C8 The computer input device of any of paragraphs C-C6, wherein the detector includes a touch-sensitive screen.

C8.1 The computer input device of paragraph C8, wherein the base plane corresponds to the touch-sensitive screen.

C8.2 The computer input device of any of paragraphs C8-C8.1, wherein the touch-sensitive screen is a display device of the associated computing device.

C9 The computer input device of any of paragraphs C-C8.2,
wherein the detector is adapted to detect relative movement of at least a portion of the input member in the x- and y-dimensions relative to the base point; and
wherein the detector is adapted to detect a position of at least a portion of the input member within a set of discrete strata of space, each stratum spaced away from the base plane in the z-dimension.

C9.1 The computer input device of paragraph C9,
wherein the controller is adapted to send a first signal to the associated computing device when a given portion of the input member is within a first stratum; and
wherein the controller is adapted to send a second signal to the associated computing device when the given portion of the input member is within a second stratum, the second stratum spaced further away from the base plane than the first stratum.

C10 The computer input device of any of paragraphs C-C9.1,
wherein the detector includes a volume of fluid and a flexible touch screen adjacent to and covering at least a portion of the volume of fluid, wherein the flexible touch screen is adapted to be engaged by the input member, and wherein the detector is adapted to detect a depth in which a portion of the flexible touch screen is pressed into the volume of fluid by the input member.

C10.1 The computer input device of paragraph C10, wherein the detector is adapted to detect a pressure of the volume of fluid.

C10.2 The computer input device of paragraph C10, wherein the detector is adapted to detect a thickness of the volume of fluid at a position corresponding to engagement of the flexible touch screen by the input member.

C10.2.1 The computer input device of paragraph C10.2, wherein the detector is adapted to detect the opacity of the volume of fluid at the position corresponding to engagement of the flexible touch screen by the input member.

C10.2.2 The computer input device of paragraph C10.2, wherein the detector is adapted to detect a distance between the flexible touch screen and a plane that is adjacent to the volume of fluid and opposing the flexible touch screen.

C11 The computer input device of any of paragraphs C-C10.2.2,
wherein the detector includes a volume of fluid and a flexible touch screen adjacent to and covering at least a portion of the volume of fluid, wherein the flexible touch screen is adapted to be engaged by the input member, wherein the detector is adapted to detect a plurality of thicknesses of the volume of fluid across the x- and y-dimensions of the base plane.

C12 The computer input device of any of paragraphs C-C11,
wherein the input member is a first input member and the signal is a first signal;
wherein the detector is further adapted to detect relative movement of at least a portion of a second input member in x-, y-, and z-dimensions relative to the base point simultaneously with detection of relative movement of the first input member; and
wherein the controller is further adapted to send a second signal to the associated computing device based at least in part on the relative movement of the second input member, C13 The computer input device of any of paragraphs C-C12, in combination with computer readable storage media including computer-executable instructions that, when executed, direct the associated computing device to:
display, on a display device, manipulation of indicia based at least in part on the signal.

C13.1 The computer input device and computer readable storage media of paragraph C13, wherein the computer-executable instructions further direct the associated computing device to:
display enlarging of the indicia based at least in part on the relative movement of at least a portion of the input member in the z-dimension toward the base plane.

C13.2 The computer input device and computer readable storage media of paragraphs C13-C13.1, wherein the computer-executable instructions further direct the associated computing device to display shrinking of the indicia based at least in part of the relative movement of at least a portion of the input member in the z-dimension away from the base plane.

C13.3 The computer input device and computer readable storage media of paragraph C13, wherein the computer-executable instructions further direct the associated computing device to:
display shrinking of the indicia based at least in part on the relative movement of at least a portion of the input member in the z-dimension toward the base plane.

C13.4 The computer input device and computer readable storage media of any of paragraphs C13 and C13.3, wherein the computer-executable instructions further direct the associated computing device to display enlarging of the indicia based at least in part of the relative movement of at least a portion of the input member in the z-dimension away from the base plane.

C13.5 The computer input device and computer readable storage media of paragraph C13, wherein the computer-executable instructions further direct the associated computing device to:
display manipulation of the indicia according to a first attribute based at least in part on relative movement of a portion of the input member in the x- and y-dimensions when the portion of the input member is a first distance away from the base plane in the z-dimension; and
display manipulation of the indicia according to a second attribute based at least in part on relative movement of the portion of the input member in the x- and y-dimensions when the portion of the input member is a second distance away from the base plane in the z-dimension.

C13.5.1 The computer input device and computer readable storage media of paragraph C13.5,
wherein the first attribute includes a first ratio of distance of movement of the portion of the input member in the x- and y-dimensions to distance of movement of the indicia on the display screen; and
wherein the second attribute includes a second ratio of distance of movement of the portion of the input member in the x- and y-dimensions to distance of movement of the indicia on the display screen.

C13.6 The computer input device and computer readable storage media of paragraph C13, wherein the computer-executable instructions further direct the associated computing device to:
display manipulation of indicia within a first window of a software application when a portion of the input member is a first distance away from the base plane; and
display manipulation of indicia within a second window of the software application when the portion of the input member is a second distance away from the base plane.

C13.7 The computer input device and computer readable storage media of paragraph C13, wherein the computer-executable instructions further direct the to associated computing device to:
display manipulation of indicia within a window of a first software application when a portion of the input member is a first distance away from the base plane; and
display manipulation of indicia within a window of a second software application when the portion of the input member is a second distance away from the base plane.

C13.8 The computer input device and computer readable storage media of paragraph C13, wherein the computer-executable instructions further direct the associated computing device to:

display, on a first display device, manipulation of indicia when a portion of the input member is a first distance away from the base plane; and display, on a second display device, manipulation of indicia when the portion of the input member is a second distance away from the base plane.

C13.9 The computer input device and computer readable storage media of paragraph C13, wherein the input member is a first input member and the signal is a first signal;

wherein the detector is further adapted to detect relative movement of at least a portion of a second input member in x-, y-, and z-dimensions relative to the base point simultaneously with detection of relative movement of the first input member;

wherein the controller is further adapted to send a second signal to the associated computing device based at least in part on the relative movement of the second input member; and wherein the computer-executable instructions further direct the associated computing device to display, on the display device, manipulation of second indicia based at least in part on the second signal.

C13.10 The computer input device and computer readable storage media of paragraph C13, wherein the controller is further adapted to send a first signal to the associated computing device when a portion of the input member is a first distance from the base plane, and to send a second signal to the associated computing device when the portion of the input member is a second distance from the base plane; and wherein the computer-executable instructions further direct the associated computing device to:

display, on the display device, manipulation of the indicia based at least in part on the first signal; and control a predetermined aspect of the associated computing device based at least in part on the second signal, wherein the predetermined aspect does not include the display of manipulation of indicia based at least in part on the detecting user-imparted relative movement of the input member.

C13.11 The computer input device and computer readable storage media of paragraph C13, wherein the computer-executable instructions further direct the associated computing device to:

display manipulation of indicia according to a first user-defined setting when a portion of the input member is a first distance away from the base plane; and display manipulation of indicia according to a second user-defined setting when the portion of the input member is a second distance away from the base plane.

C14 The computer input device and computer readable storage media of any of paragraphs C-C12 or the computer input device and computer readable storage media of any of paragraphs C13-C13.11, in combination with an associated computing device.

C15 The computer input device and computer readable storage media of any of paragraphs C13-C14, wherein the computer input device includes at least a portion of the computer readable storage media.

C16 The computer input device and computer readable storage media of any of paragraphs C13-C15, wherein an associated computing device includes at least a portion of the computer readable storage media.

C17 A computer input device kit, comprising:

the computer input device and computer readable storage media of any of paragraphs C13-C13.11.

D Computer readable storage media including computer-executable instructions that, when executed, direct a computing device to perform the method of any of paragraphs A-A13.

D1 The computer readable storage media of paragraph D, in combination with the computer input device of any of paragraphs C-C12.

D2 The computer readable storage media of paragraph D, in combination with the computer input device and computer readable storage media of any of paragraphs C13-C13.11.

D3 The computer readable storage media of any of paragraphs D-D2, in combination with an associated computing device.

In the event that any of the references that are incorporated by reference herein define a term in a manner or are otherwise inconsistent with either the non-incorporated disclosure of the present application or with any of the other incorporated references, the non-incorporated disclosure of the present application shall control and the term or terms as used therein only control with respect to the patent document in which the term or terms are defined.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

It is believed that the following claims particularly point out certain combinations and subcombinations that are directed to one of the disclosed inventions and are novel and non-obvious. Inventions embodied in various combinations and subcombinations of features, functions, elements, properties, steps and/or methods may be claimed through amendment of the present claims or presentation of new claims in this application or in a related application. Such amended or new claims, whether they are directed to a different invention or directed to the same invention, whether different, broader, narrower, or equal in scope to the original claims, are also regarded as included within the subject matter of the present disclosure.

INDUSTRIAL APPLICABILITY

The present disclosure is applicable to the computing fields, and is specifically applicable to computer input devices.

The invention claimed is:

1. A computer input device, comprising:
    a detector adapted (i) to detect relative movement of at least a portion of an input member in x and y-dimensions relative to a base point in a base plane and (ii) to detect a position of at least a portion of the input member within a set of discrete strata of space, each stratum spaced away from the base plane in the z-dimension; and
    a controller adapted to send signals to an associated computing device based at least in part on the relative movement of the input member, wherein the controller is adapted (i) to send a first signal to the associated computing device when a given portion of the input member is within a first stratum, and (ii) to send a second signal to the associated computing device when the given portion of the input member is within a second stratum, and wherein the second stratum is spaced farther away from the base plane than the first stratum.

2. The computer input device of claim 1,
    wherein the detector includes:
        a first detector adapted to detect relative movement of a first portion of the input member in the x- and y-dimensions relative to the base point;
        a second detector adapted to detect relative movement of a second portion of the input member in the z-dimension relative to the base point; and
    wherein the controller is adapted to send the first signal to the associated computing device based at least in part on the relative movement of the first portion in the x- and y-dimensions relative to the base point, and further wherein the controller is adapted to send the second signal to the associated computing device based at least in part on the relative movement of the second portion in the z-dimension relative to the base point.

3. The computer input device of claim 1,
    wherein the detector includes a plurality of distance sensors, each distance sensor adapted to detect a distance from the respective distance sensor to the at least a portion of the input member.

4. The computer input device of claim 1, wherein the input member includes a stylus.

5. The computer input device of claim 1, wherein the input member includes a mouse.

6. The computer input device of claim 1,
    wherein the input member includes a first portion, and wherein the detector is adapted to detect relative movement of the first portion of the input member in the x- and y-dimensions relative to the base point; and
    wherein the input member includes a second portion, and wherein the detector is adapted to detect relative movement of the second portion of the input member in the z-dimension relative to the base point.

7. The computer input device of claim 6, wherein the input member includes a mouse, wherein the mouse includes a base portion and a finger-receiving portion, wherein the first portion of the input member includes the base portion, wherein the second portion of the input member includes the finger-receiving portion, wherein the finger-receiving portion defines a finger-receiving region adapted to receive a user's finger for manipulation of the finger-receiving portion in the z-dimension relative to the base portion.

8. The computer input device of claim 1, wherein the input member is a human hand.

9. The computer input device of claim 1, wherein the detector is adapted to not require sensing of contact between the input member and the computer input device to detect relative movement of the input member.

10. The computer input device of claim 1, wherein the detector includes a touch-sensitive screen.

11. The computer input device of claim 10, wherein the touch-sensitive screen is a display device of the associated computing device.

12. The computer input device of claim 1,
    wherein the input member is a first input member, the first signal is a first input member signal, and the second signal is a second first input member signal;
    wherein the detector is further adapted (i) to detect relative movement of at least a portion of a second input member in x- and y-dimensions relative to the base point simultaneously with detection of relative movement of the first input member in the x- and y-dimensions relative to the base point, and (ii) to detect a position of at least a portion of the second input member within the set of discrete strata of space simultaneously with detection of the position of the first input member within the set of discrete strata of space; and
    wherein the controller is further adapted to send signals to the associated computing device based at least in part on the relative movement of the second input member, wherein the controller is adapted (i) to send a first second input member signal to the associated computing device when a given portion of the second input member is within the first stratum, and (ii) to send a second input member signal to the associated computing device when the given portion of the second input member is within the second stratum.

13. The computer input device of claim 1 in combination with non-transitory computer readable storage media including computer-executable instructions that, when executed, direct the associated computing device to:
    display, on a display device, manipulation of indicia based at least in part on the signals.

14. The computer input device of claim 1,
    wherein the detector includes a volume of fluid and a flexible touch screen adjacent to and covering at least a portion of the volume of fluid, wherein the flexible touch screen is adapted to be engaged by the input member, and wherein the detector is adapted to detect a depth in which a portion of the flexible touch screen is pressed into the volume of fluid by the input member.

15. The computer input device of claim 1,
    wherein the detector includes a volume of fluid and a flexible touch screen adjacent to and covering at least a portion of the volume of fluid, wherein the flexible touch screen is adapted to be engaged by the input member, and wherein the detector is adapted to detect a plurality of thicknesses of the volume of fluid across the x- and y-dimensions of the base plane.

16. A method of utilizing the computer input device of claim 1 for displaying, by a display device, manipulation of indicia based at least in part on detecting movement of the input member, the method comprising:
    detecting, by the computer input device, user-imparted relative movement of the input member in the x-, y-, and z-dimensions relative to the base point in the base plane;
    sending the first signal when a given portion of the input member is within the first stratum; and sending the second signal when the given portion of the input member is within the second stratum.

17. A computing device configured to perform the method of claim 16.

18. Non-transitory computer readable storage media including computer-executable instructions that, when executed, direct a computing device to perform the method of claim 16.

19. A computer input device, comprising:
a detector adapted (i) to detect relative movement of at least a portion of a first input member in x-, y-, and z-dimensions relative to a base point in a base plane, and (ii);
to detect relative movement of at least a portion of a second input member in x-, y-, and z-dimensions relative to the base point simultaneously with detection of relative movement of the first input member; and
a controller adapted (i) to send a first signal to an associated computing device based at least in part on the relative movement of the first input member, and (ii) to send a second signal to the associated computing device based at least in part on the relative movement of the second input member.

20. In combination:
a computer input device, comprising:
   a detector adapted to detect relative movement of at least a portion of an input member in x-, y-, and z-dimensions relative to a base point in a base plane; and
   a controller adapted to send a signal to an associated computing device based at least in part on the relative movement of the input member; and
non-transitory computer readable storage media including computer-executable instructions that, when executed, direct the associated computing device to:
display, on a display device, manipulation of indicia based at least in part on the signal.

21. The combination of claim 20, wherein the computer-executable instructions further direct the associated computing device to:
display manipulation of the indicia according to a first attribute based at least in part on relative movement of a portion of the input member in the x- and y-dimensions when the portion of the input member is a first distance away from the base plane in the z-dimension; and
display manipulation of the indicia according to a second attribute based at least in part on relative movement of the portion of the input member in the x- and y-dimensions when the portion of the input member is a second distance away from the base plane in the z-dimension.

22. The combination of claim 21,
wherein the first attribute includes a first ratio of distance of movement of the portion of the input member in the x- and y-dimensions to distance of movement of the indicia on the display screen; and
wherein the second attribute includes a second ratio of distance of movement of the portion of the input member in the x- and y-dimensions to distance of movement of the indicia on the display screen.

23. The combination of claim 20,
wherein the input member is a first input member and the signal is a first signal;
wherein the detector is further adapted to detect relative movement of at least a portion of a second input member in x-, y-, and z-dimensions relative to the base point simultaneously with detection of relative movement of the first input member;
wherein the controller is further adapted to send a second signal to the associated computing device based at least in part on the relative movement of the second input member; and
wherein the computer-executable instructions further direct the associated computing device to display, on the display device, manipulation of second indicia based at least in part on the second signal.

24. The combination of claim 20,
wherein the controller is further adapted to send a first signal to the associated computing device when a portion of the input member is a first distance from the base plane, and to send a second signal to the associated computing device when the portion of the input member is a second distance from the base plane; and
wherein the computer-executable instructions further direct the associated computing device to:
   display, on the display device, manipulation of the indicia based at least in part on the first signal; and
   control a predetermined aspect of the associated computing device based at least in part on the second signal, wherein the predetermined aspect does not include the display of manipulation of indicia based at least in part on the detecting user-imparted relative movement of the input member.

25. The combination of claim 20, wherein the computer-executable instructions further direct the associated computing device to:
display manipulation of indicia according to a first user-defined setting when a portion of the input member is a first distance away from the base plane; and
display manipulation of indicia according to a second user-defined setting when the portion of the input member is a second distance away from the base plane.

26. The combination of claim 20, in further combination with an associated computing device.

27. The combination of claim 26, wherein the associated computing device includes at least a portion of the computer readable storage media.

28. The combination of claim 20, wherein the computer input device includes at least a portion of the computer readable storage media.

29. The combination of claim 20, wherein the computer-executable instructions further direct the associated computing device to:
display enlarging of the indicia based at least in part on the relative movement of at least a portion of the input member in the z-dimension toward the base plane; and
display shrinking of the indicia based at least in part of the relative movement of at least a portion of the input member in the z-dimension away from the base plane.

30. The combination of claim 20, wherein the computer-executable instructions further direct the associated computing device to:
display shrinking of the indicia based at least in part on the relative movement of at least a portion of the input member in the z-dimension toward the base plane; and
display enlarging of the indicia based at least in part of the relative movement of at least a portion of the input member in the z-dimension away from the base plane.

31. The combination of claim 20, wherein the computer-executable instructions further direct the associated computing device to:
display manipulation of indicia within a first window of a software application when a portion of the input member is a first distance away from the base plane; and display manipulation of indicia within a second window of the software application when the portion of the input member is a second distance away from the base plane.

32. The combination of claim 20, wherein the computer-executable instructions further direct the associated computing device to:
  display manipulation of indicia within a window of a first software application when a portion of the input member is a first distance away from the base plane; and
  display manipulation of indicia within a window of a second software application when the portion of the input member is a second distance away from the base plane.

33. The combination of claim 20, wherein the computer-executable instructions further direct the associated computing device to:
  display, on a first display device, manipulation of indicia when a portion of the input member is a first distance away from the base plane; and
  display, on a second display device, manipulation of indicia when the portion of the input member is a second distance away from the base plane.

34. The combination of claim 20, wherein the computer input device is a mouse.

35. The combination of claim 20, wherein the input member includes a stylus or a human hand.

36. The combination of claim 35, wherein the human hand includes a gloved human hand.

37. The combination of claim 20, wherein the detector includes a touch-sensitive screen, and wherein the touch-sensitive screen is the display device.

* * * * *

UNITED STATES PATENT AND TRADEMARK OFFICE
CERTIFICATE OF CORRECTION

| | | |
|---|---|---|
| PATENT NO. | : 8,552,980 B2 | Page 1 of 1 |
| APPLICATION NO. | : 12/769888 | |
| DATED | : October 8, 2013 | |
| INVENTOR(S) | : Gregory A. Shaver et al. | |

It is certified that error appears in the above-identified patent and that said Letters Patent is hereby corrected as shown below:

In the Claims

Column 23, line 10, in the phrase "an input member in x and y-dimensions" please insert a -- - -- after "x".

Column 24, line 15, in the phrase "signal is a first input member signal" please insert --first-- after "first" and before "input".

Signed and Sealed this

Eleventh Day of February, 2014

Michelle K. Lee
*Deputy Director of the United States Patent and Trademark Office*